(12) United States Patent
Shim et al.

(10) Patent No.: US 12,371,363 B2
(45) Date of Patent: Jul. 29, 2025

(54) APPARATUS FOR MANUFACTURING GLASS ARTICLE, METHOD FOR MANUFACTURING GLASS ARTICLE, GLASS ARTICLE, AND DISPLAY DEVICE INCLUDING THE SAME

(71) Applicant: Samsung Display Co., LTD., Yongin-si (KR)

(72) Inventors: Gyu In Shim, Yongin-si (KR); Byung Hoon Kang, Hwaseong-si (KR); Seung Hoon Kim, Seongnam-si (KR); Hoi Kwan Lee, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 635 days.

(21) Appl. No.: 17/001,303

(22) Filed: Aug. 24, 2020

(65) Prior Publication Data

US 2021/0188688 A1 Jun. 24, 2021

(30) Foreign Application Priority Data

Dec. 24, 2019 (KR) .................. 10-2019-0174122

(51) Int. Cl.
| | |
|---|---|
| *C03B 27/012* | (2006.01) |
| *C03B 25/087* | (2006.01) |
| *C03B 27/052* | (2006.01) |
| *C03C 23/00* | (2006.01) |
| *G02F 1/1333* | (2006.01) |

(52) U.S. Cl.
CPC .......... *C03B 27/012* (2013.01); *C03B 25/087* (2013.01); *C03B 27/052* (2013.01); *C03C 23/007* (2013.01); *C03C 2203/52* (2013.01); *G02F 1/133308* (2013.01)

(58) Field of Classification Search
None
See application file for complete search history.

(56) References Cited

U.S. PATENT DOCUMENTS

| | | | | |
|---|---|---|---|---|
| 1,923,590 | A | * | 8/1933 | Schlemm ............ A47J 37/0814 99/327 |
| 3,002,321 | A | | 10/1961 | Dunipace et al. |
| 3,147,104 | A | * | 9/1964 | Dunipace .............. C03B 27/056 65/111 |

(Continued)

FOREIGN PATENT DOCUMENTS

| | | |
|---|---|---|
| CN | 101448749 A | 6/2009 |
| CN | 107108346 A | 8/2017 |

(Continued)

OTHER PUBLICATIONS

Extended European Search Report—European Application No. 20216857.1 dated May 21, 2021.

(Continued)

*Primary Examiner* — Phu Vu
(74) *Attorney, Agent, or Firm* — CANTOR COLBURN LLP

(57) ABSTRACT

An apparatus for manufacturing a glass article includes a plurality of side portions spaced apart from each other; and a plurality of heat supply portions disposed on each of the side portions; where the side portions adjacent to each other are disposed to face each other, and a glass is allowed to be disposed between the adjacent side portions.

15 Claims, 21 Drawing Sheets

(56) References Cited

U.S. PATENT DOCUMENTS

| | | | |
|---|---|---|---|
| 6,787,485 B1 | 9/2004 | Probst | |
| 8,042,359 B2 | 10/2011 | Coppola et al. | |
| 10,329,193 B2 | 6/2019 | Yasuda et al. | |
| 2006/0144091 A1* | 7/2006 | Kato | C03B 5/021 65/335 |
| 2008/0279998 A1* | 11/2008 | Park | A47J 37/085 426/466 |
| 2010/0015399 A1* | 1/2010 | Coupland | C04B 41/009 428/172 |
| 2016/0102015 A1 | 4/2016 | Yasuda et al. | |
| 2022/0148895 A1* | 5/2022 | Mizojiri | H05B 1/0233 |

FOREIGN PATENT DOCUMENTS

| | | | | |
|---|---|---|---|---|
| CN | 110156337 A | | 8/2019 | |
| CN | 109574517 B | | 4/2022 | |
| JP | 55015910 A | * | 2/1980 | |
| JP | S5779126 | | 5/1982 | |
| JP | 5910096 B2 | | 4/2016 | |
| KR | 200383667 Y1 | | 5/2005 | |
| KR | 20060007267 A | | 1/2006 | |
| KR | 101121449 B1 | | 3/2012 | |
| KR | 101386596 B1 | | 4/2014 | |
| KR | 1020160089941 A | | 7/2016 | |
| KR | 101781176 B1 | | 9/2017 | |
| KR | 101825276 B1 | | 2/2018 | |
| KR | 101972444 B1 | | 4/2019 | |
| KR | 20190033724 A | | 4/2019 | |
| TW | 201406678 A | | 2/2014 | |
| WO | 2013130653 | | 9/2013 | |
| WO | WO-2014022632 A1 | * | 2/2014 | C03B 29/10 |
| WO | 2014189118 A1 | | 11/2014 | |

OTHER PUBLICATIONS

European Office Action dated Apr. 6, 2023, issued in corresponding European Patent Application No. 20216857.1.

Chinese Office Action—Chinese Application No. 202011549715.4 dated Nov. 27, 2023.

* cited by examiner

APPARATUS FOR MANUFACTURING GLASS ARTICLE, METHOD FOR MANUFACTURING GLASS ARTICLE, GLASS ARTICLE, AND DISPLAY DEVICE INCLUDING THE SAME

This application claims priority to Korean Patent Application No. 10-2019-0174122, filed on Dec. 24, 2019, and all the benefits accruing therefrom under 35 U.S.C. § 119, the content of which in its entirety is herein incorporated by reference.

BACKGROUND

1. Field

The disclosure relates to an apparatus for manufacturing a glass article, a method for manufacturing a glass article, a glass article, and a display device including the glass article.

2. Description of the Related Art

Glass articles are widely used in electronic devices or construction materials including display devices. For example, a glass article is applied to a substrate of a flat panel display device such as a liquid crystal display ("LCD"), an organic light emitting display ("OLED") and an electrophoretic display ("EPD"), or a cover window for protecting it.

As portable electronic devices such as smart phones and tablet personal computers ("PC"s) have become popular, glass articles included in such portable electronic devices are frequently exposed to external impacts. Accordingly, it is desired to develop a glass article which is thin for portability and can withstand external impacts, and an attempt has been made to improve the strength of a glass article by thermal or chemical strengthening.

SUMMARY

During a manufacturing of a strengthened glass article, damage such as dents or cracks may occur on the surface of the strengthened glass article, thereby deteriorating physical properties and/or quality of the strengthened glass article. Such a damage may be reduced through a heat treatment, but the compressive stress of the strengthened glass article may be degraded when the heat treatment is performed thereon, such that the strength thereof may be decreased.

Embodiments of the disclosure provide an apparatus for manufacturing a glass article, capable of heat-treating a strengthened glass article in a short time.

Embodiments of the disclosure also provide a method for manufacturing a glass article, capable of heat-treating a strengthened glass article in a short time.

Embodiments of the disclosure also provide a strengthened glass article heat-treated in a short time.

Embodiments of the disclosure also provide a display device including a strengthened glass article heat-treated in a short time.

According to embodiments of an apparatus for manufacturing a glass article and a method for manufacturing a glass article, a strengthened glass article may be effectively manufactured in a short time, thereby preventing a decrease in compressive stress due to heat treatment of the strengthened glass article.

In such embodiments of a glass article and a display device including the glass article, by performing heat treatment in a short time, the glass article may have a sufficient strength with considerably high compressive stress without damage such as dents or cracks.
T
According to an embodiment, an apparatus for manufacturing a glass article includes a plurality of side portions spaced apart from each other; and a plurality of heat supply portions disposed on each of the side portions; where adjacent side portions adjacent to each other are disposed to face each other, and a glass is allowed to be disposed between the adjacent side portions.

In an embodiment, a heating rate may be about 10 Kelvin per minute (K/min) or greater.

In an embodiment, the heating rate of the apparatus may be variable.

In an embodiment, each of the heat supply portions may have a size of about 2 square centimeters ($cm^2$) or greater and may include a halogen lamp.

In an embodiment, the heat supply portions on one of the side portions may be arranged in a matrix form in a first direction and a second direction intersecting the first direction, and the side portions may include a thermally conductive material.

In an embodiment, the thermally conductive material has a thermal conductivity of about 200 Watts per meter-Kelvin (W/mk) or greater, and the thermally conductive material may include aluminum or a graphene.

In an embodiment, each of the side portions may include a first side portion, and a second side portion disposed between the first side portion and the heat supply portions thereon.

In an embodiment, in a plan view, the first side portion and the second side portion have a same size as each other.

In an embodiment, the second side portion may include the thermally conductive material.

In an embodiment, the second side portion includes a plurality of side patterns, each having a linear shape extending in the first direction, adjacent side patterns adjacent to each other are spaced apart from each other in the second direction, and the side patterns are disposed to overlap the heat supply portions.

In an embodiment, the heat supply portions disposed on one of the side patterns and the heat supply portions disposed on another one of the side patterns may operate independently of each other.

In an embodiment, the second side portion may further include a connection portion connecting the adjacent side patterns spaced apart from each other in the second direction to each other.

In an embodiment, the side portions may be regularly arranged with a same separation distance therebetween, and a separation distance between the adjacent side portions may be in a range of about 1 centimeter (cm) to about 2 cm.

In an embodiment, the apparatus may further include a support portion which supports the side portions.

In an embodiment, a groove may be defined in a surface of the support portion between the adjacent side portions.

In an embodiment, a separation distance between the groove and one of the adjacent side portions may be equal to a separation distance between the groove and the other of the adjacent side portions.

In an embodiment, the apparatus may further include a fixing portion which fixes the glass disposed between the adjacent side portions.

According to another embodiment, a method for manufacturing a glass article includes: molding a glass; strengthening the molded glass; and heat-treating the strengthened glass using a glass article manufacturing apparatus. In such an embodiment, the glass article manufacturing apparatus includes a plurality of side portions spaced apart from each other, and a plurality of heat supply portions disposed on each of the side portions, and adjacent side portions of the glass article manufacturing apparatus, which are adjacent to each other, are disposed to face each other.

In an embodiment, the heat-treating the strengthened glass may include: placing the strengthened glass between the adjacent side portions of the glass article manufacturing apparatus, and heating up the glass article manufacturing apparatus to heat-treat the strengthened glass.

In an embodiment, the heating up of the glass article manufacturing apparatus may include varying a heating rate of the glass article manufacturing apparatus.

According to another embodiment, a glass article includes a first surface; a second surface opposite to the first surface; a first compressive region extending from the first surface to a point at a first compression depth; a second compressive region extending from the second surface to a point at a second compression depth; and a tensile region disposed between the first compressive region and the second compressive region, where a glass transition temperature of the glass article is higher than glass transition temperature of a glass article heat-treated at a heating rate in a range of about 10 K/min to about 30 K/min.

In an embodiment, the glass article may further include a first portion extending in a first direction, and a second portion extending in the first direction and separated from the first portion in a second direction intersecting the first direction, where a glass transition temperature of the first portion and a glass transition temperature of the second portion may be different from each other.

According to another embodiment, a display device includes a display panel including a plurality of pixels; a cover window disposed on the display panel; and an optically transparent bonding layer disposed between the display panel and the cover window. In such an embodiment, the cover window includes: a first surface; a second surface opposite to the first surface; a first compressive region extending from the first surface to a point at a first compression depth; a second compressive region extending from the second surface to a point at a second compression depth; and a tensile region disposed between the first compressive region and the second compressive region, where a glass transition temperature of the cover window is higher than a glass transition temperature of a glass article heat-treated at a heating rate in a range of about 10 K/min to about 30 K/min.

BRIEF DESCRIPTION OF THE DRAWINGS

The above and other features of the disclosure will become more apparent by describing in detail exemplary embodiments thereof with reference to the attached drawings, in which.

DETAILED DESCRIPTION

Figure 1:
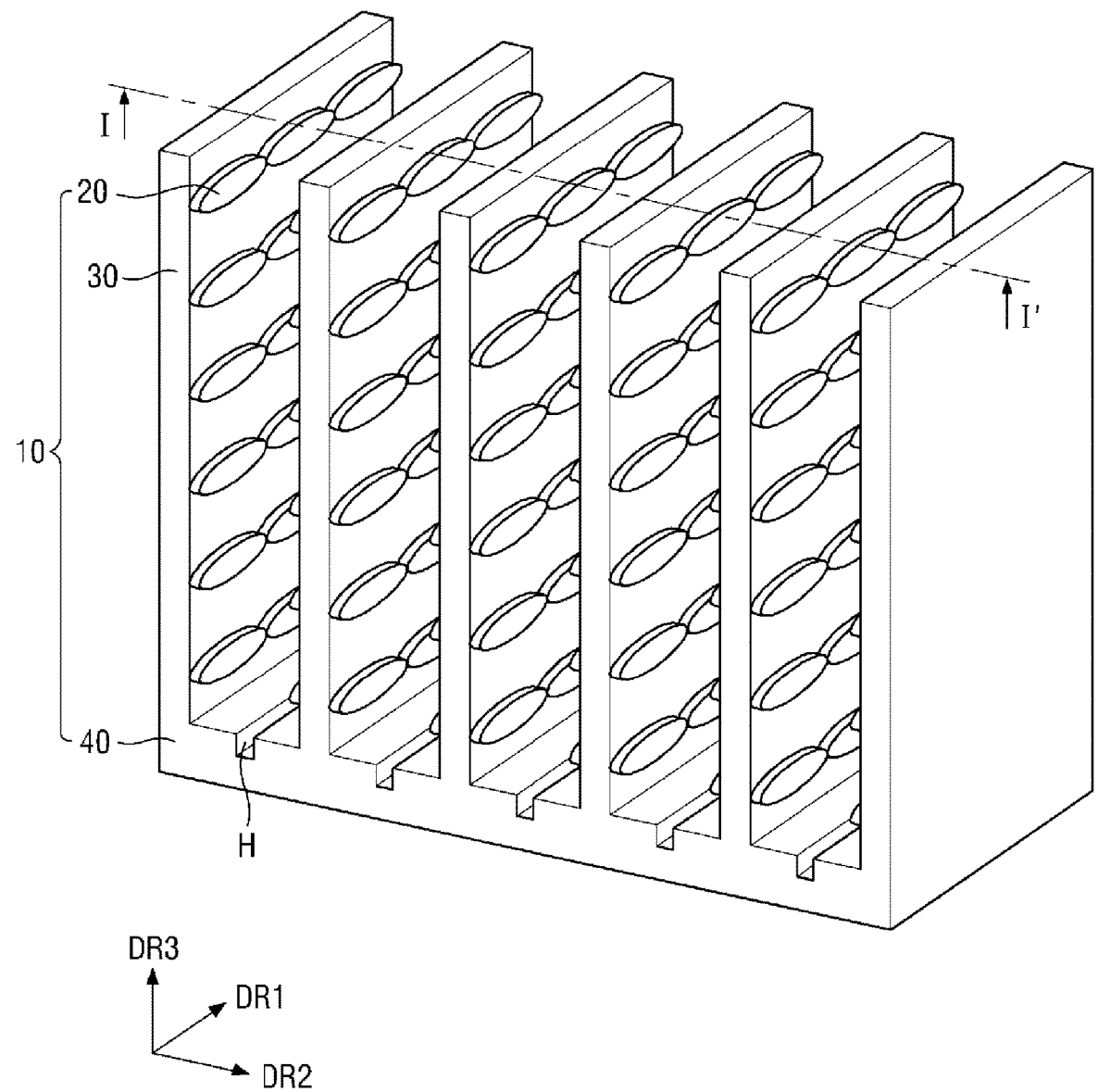
FIG. 1 is a perspective view of an apparatus for manufacturing a glass article according to an exemplary embodiment.

Specific structural and functional descriptions of embodiments of the invention disclosed herein are only for illustrative purposes of the embodiments of the invention. The invention may be embodied in many different forms without departing from the spirit and significant characteristics of the invention. Therefore, the embodiments of the invention are disclosed only for illustrative purposes and should not be construed as limiting the invention. That is, the invention is only defined by the scope of the claims.

It will be understood that when an element is referred to as being related to another element such as being "coupled" or "connected" to another element, it can be directly coupled or connected to the other element or intervening elements may be therebetween. In contrast, it should be understood that when an element is referred to as being related to another element such as being "directly coupled" or "directly connected" to another element, there are no intervening elements present. Other expressions that explain the relationship between elements, such as "between," "directly between," "adjacent to," or "directly adjacent to," should be construed in the same way.

Throughout the specification, the same reference numerals will refer to the same or like parts.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures.

For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

As used herein, the term "glass article" refers to an article made entirely or partially of glass.

Hereinafter, exemplary embodiments of the disclosure will be described with reference to the accompanying drawings.

FIG. 1 is a perspective view of an apparatus for manufacturing a glass article according to an exemplary embodiment.

Referring to FIG. 1, an embodiment of an apparatus 10 for manufacturing a glass article may include a heat supply portion 20, a side portion 30, and a support portion 40. The support portion 40 may serve to support the heat supply portion 20 and the side portion 30. The support portion 40 may include a thermally conductive material. The support portion 40 may be a flat plate with sides extending along a first direction DR1 and a second direction DR2 intersecting the first direction DR1. The planar shape of the support portion 40 may be a rectangular shape. In an embodiment, where the planar shape of the support portion 40 is a rectangular shape, the support portion 40 may include short sides extending along the first direction DR1 and long sides extending along the second direction DR2. However, the disclosure is not limited thereto, and the short side direction and the long side direction of the support portion 40 may be opposite or changed vice versa.

In an alternative embodiment, the planar shape of the support portion 40 may be a square, a circle, an ellipse or other polygons.

The support portion 40 may serve to support the side portion 30 and the heat supply portion 20 to be described later.

The support portion 40 may include a groove H indented in a thickness direction from the surface thereof. The groove H may be defined by a depressed portion of the support portion 40 in the thickness direction from the surface of the support portion 40. The groove H may be a portion to which a glass article to be heat-treated by the glass article manufacturing apparatus 10 is fixed. In such an embodiment, the glass article to be heat-treated by the glass article manufacturing apparatus 10 may be fixed by the groove H.

The groove H may be disposed between adjacent side portions 30. A separation distance from the groove H to the adjacent side portion 30 located on one side may be the same as a separation distance from the groove H to the adjacent side portion 30 located on the opposing side.

The side portion 30 may be physically connected to the support portion 40. The side portion 30 may extend from the support portion 40 along the thickness direction (or a third direction DR3). The side portion 30 may disposed in a direction perpendicular to the support portion 40. The planar shape of the side portion 30 may be a rectangular shape.

In an embodiment, where the planar shape of the side portion 30 is a rectangular shape, the side portion 30 may include short sides extending along the first direction DR1 and long sides extending along the third direction DR3. However, the disclosure is not limited thereto, and the short side direction and the long side direction of the side portion 30 may be opposite or changed vice versa.

In an alternative embodiment, the planar shape of the side portion 30 may be a square, a circle, an ellipse or other polygons.

The side portion 30 may be provided in plural. The plurality of side portions 30 may be spaced apart from each other along the second direction DR2. The adjacent side portions 30 of the plurality of side portions 30 spaced apart along the second direction DR2 may be disposed to face each other or parallel to each other.

The plurality of side portions 30 may be regularly arranged with a same or constant separation distance or be spaced apart from each other with the same separation distance along the second direction DR2.

The side portion 30 may include a thermally conductive material. In an embodiment, the side portion 30 including a thermally conductive material may have a thermal conductivity of about 40 Watts per meter-Kelvin (W/mK) or greater, about 60 W/mK or greater, about 100 W/mK or greater, about 200 W/mK or greater, about 237 W/mK or greater, or about 5000 W/mK or greater. In such an embodiment, the side portion 30 may include a material having a thermal conductivity of about 40 W/mK or greater, about 60 W/mK or greater, about 100 W/mK or greater, about 200 W/mK or greater, about 237 W/mK or greater, or about 5000 W/mK or greater.

In an embodiment, the thermally conductive material of the side portion 30 may include a metal or a graphene. In such an embodiment, the metal may include molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), copper (Cu) or the like, for example. In one embodiment, for example, the thermally conductive material of the side portion 30 may be aluminum (Al).

The side portion 30 may serve to smoothly heat-treat a glass article by including the thermally conductive material.

FIG. 1 illustrates an embodiment where the number of the side portions 30 is six, but not being limited thereto. Alternatively, the number of the side portions 30 may be variously modified, e.g., two to five, or seven or more.

In an embodiment, as shown in FIG. 1, among the plurality of side portions 30, the side portions 30 respectively disposed at one end and the other end of the support portion 40 in the second direction DR2 may be aligned with the side surfaces of the support portion 40 along the third direction DR3, respectively.

The heat supply portion 20 may be disposed on a side portion 30. The heat supply portion 20 may be disposed on a side surface of the side portion 30. The heat supply portion 20 may be provided in plural, and the heat supply portions 20 disposed on the side portions 30 respectively disposed at one end and the other end of the support portion 40 in the second direction DR2 (also referred to as outermost side portions) may be disposed on inner side surfaces thereof. The heat supply portions 20 disposed on the side portions 30 disposed between the outermost side portions 30 may be disposed on one side surface and the other side surface of each of the side portions 30 disposed between the outermost side portions 30.

However, the disclosure is not limited thereto, and the heat supply portions 20 disposed on the outermost side portions 30 may also be disposed on one side surface and the other side surface of each of the outermost side portions 30.

The heat supply portion 20 disposed on any one of one side surface and the other side surface of one side portion 30 may be provided plurally. The plurality of heat supply portions 20 disposed on any one of one side surface and the other side surface of one side portion 30 may be arranged in a matrix form. In one embodiment, for example, the plurality of heat supply portions 20 disposed on any one of one side surface and the other side surface of one side portion 30 may be arranged in a matrix form with rows in the first direction DR1 and columns in the third direction DR3.

Although FIG. 1 shows an embodiment where the plurality of heat supply portions 20 disposed on any one of one side surface and the other side surface of one side portion 30 are arranged in a matrix form with six rows and three columns, that is, three heat supply portions are arranged along the first direction DR1 and six heat supply portions are arranged along the third direction DR3, the disclosure is not limited thereto.

In an embodiment, as shown in FIG. 1, the heat supply portions 20 adjacent to each other along the first direction DR1 may be in contact with each other, but not being limited thereto. Alternatively, the heat supply portions 20 adjacent to each other along the first direction DR1 may be spaced apart from each other with predetermined intervals.

The heat supply portion 20 may serve to supply heat to the glass article and the side portion 30 on which the heat supply portion 20 is disposed. In such an embodiment, the glass article may be directly supplied with heat through the heat supply portion 20, and heat may also be supplied to the glass article through the side portion 30 including the thermally conductive material supplied with heat through the heat supply portion 20.

The heating rate of the heat supply portion 20 may be variable or controlled.

In an embodiment, the planar shape of the heat supply portion 20 may be an elliptic shape as shown in FIG. 1. However, the disclosure is not limited thereto, and alternatively, the planar shape of the heat supply portion 20 may be a circular shape, a quadrangular shape, or other polygonal shapes.

The planar size of the heat supply portion 20 may be about 2 square centimeter ($cm^2$) or greater, but is not limited thereto.

In an embodiment, a conventional device capable of supplying heat may be applied as the heat supply portion 20. In an embodiment, the heat supply portion 20 may be a halogen lamp, an incandescent bulb, a three-wavelength lamp, a light emitting diode ("LED") lamp, or the like, for example. In one embodiment, for example, the heat supply portion 20 may include a halogen lamp.

All the heat supply portions 20 arranged on the side portions 30 may be turned on or off at the same time in response to an on/off signal. However, the disclosure is not limited thereto.

Figure 2:
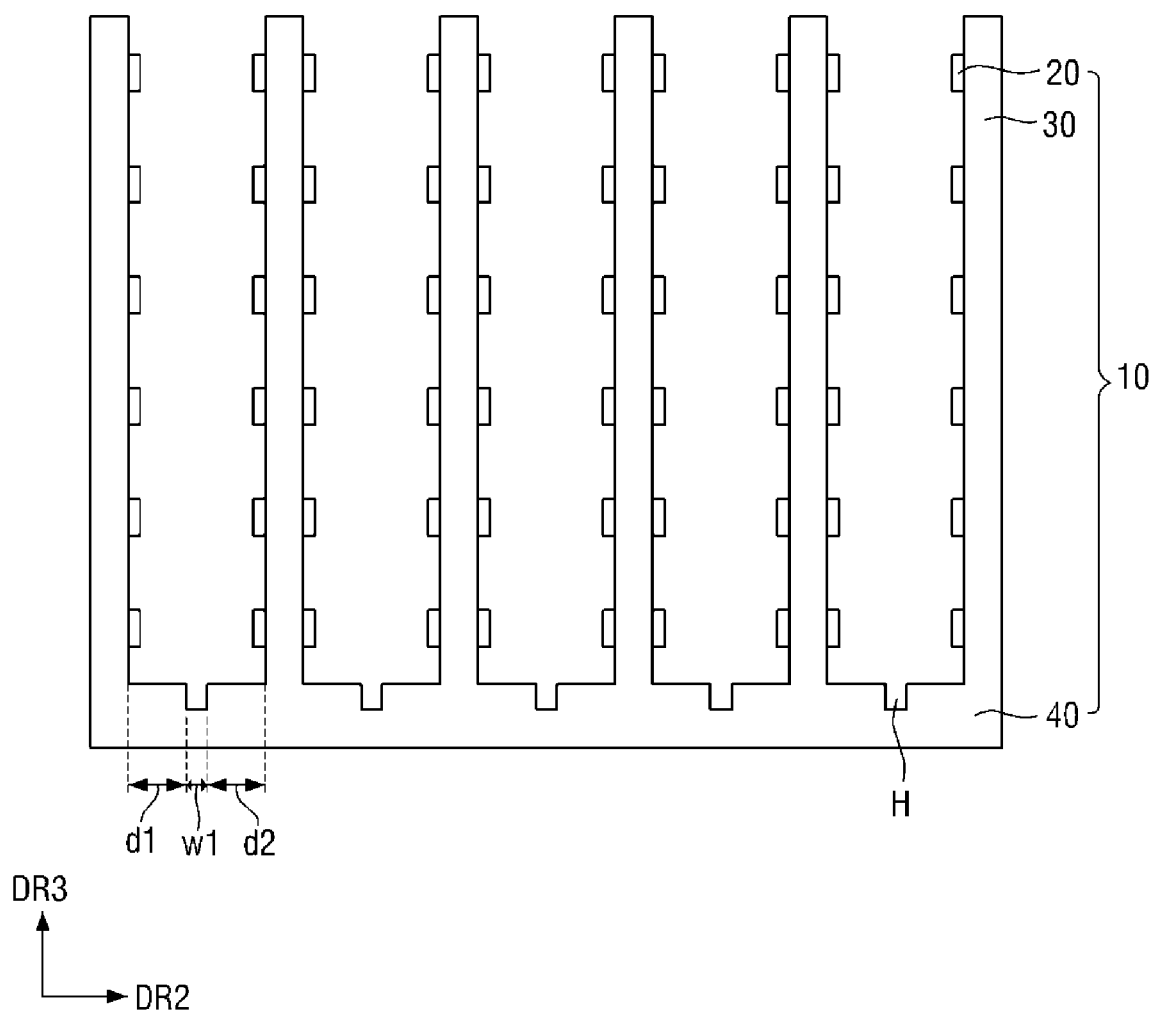
FIG. 2 is a cross-sectional view taken along line I-I' of FIG. 1.

FIG. 2 is a cross-sectional view taken along line I-I' of FIG. 1.

Referring to FIG. 2, in an embodiment, a width w1 of the groove H in the second direction DR2 may vary depending on the width of the glass article to be heat-treated by the glass article manufacturing apparatus 10. In an embodiment, a width of the glass article heat-treated by the glass article manufacturing apparatus 10 may be, but is not limited to, in a range of about 0.1 millimeter (mm) to about 2 mm, about 0.8 mm or less, about 0.75 mm or less, about 0.7 mm or less, about 0.6 mm or less, about 0.65 mm or less, about 0.5 mm or less, about 0.3 mm or less, in a range of 0.45 mm to 0.8 mm, in a range of about 0.5 mm to about 0.75 mm, or in a range of about 0.03 mm to about 0.15 mm, for example.

Since the groove H serves to fix the glass article to be heat-treated by the glass article manufacturing apparatus 10 as described above, the width w1 of the groove H may be equal to a width of the glass article. Accordingly, in an embodiment, the width w1 of the groove H may be in a range of about 0.1 mm to about 2 mm, about 0.8 mm or less, about 0.75 mm or less, about 0.7 mm or less, about 0.6 mm or less, about 0.65 mm or less, about 0.5 mm or less, about 0.3 mm or less, in a range of about 0.45 mm to about 0.8 mm, or in a range of about 0.5 mm to about 0.75 mm, for example.

A separation distance d1 from the groove H to an adjacent side portion 30 located on one side in the second direction DR2 may be substantially the same as a separation distance d2 from the groove H to the adjacent side portion 30 located on the other side in the second direction DR2. The term "substantially the same" as used herein may include not only a case where the separation distance d1 from the groove H to the adjacent side portion 30 located on one side is completely identical to the separation distance d2 from the groove H to the adjacent side portion 30 located on the other side, but also a case where the difference falls within about 20% due to manufacturing process errors.

Figure 3:
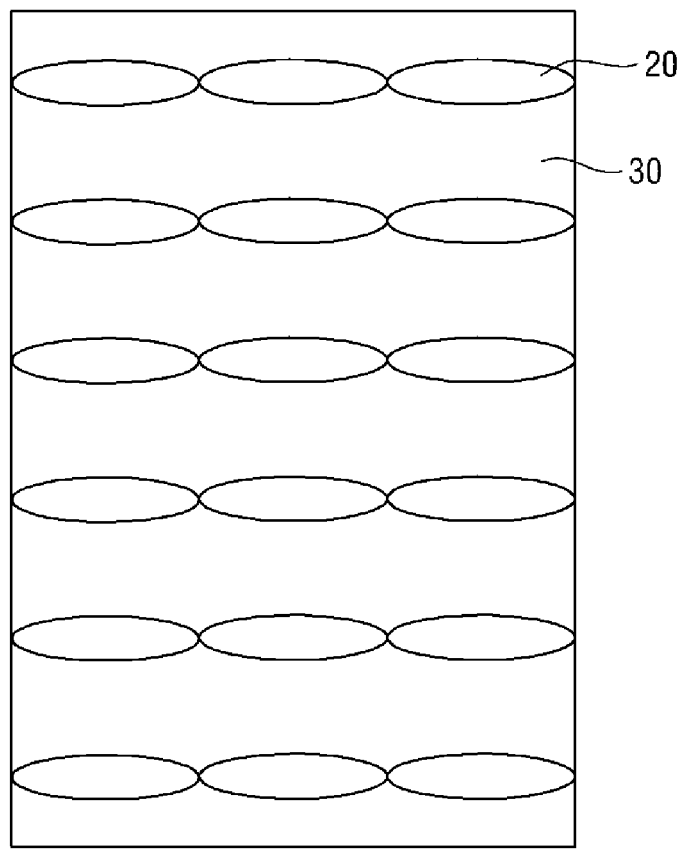
FIG. 3 is a plan view of a side portion and a heat supply portion of FIG. 1.
Figure 3:
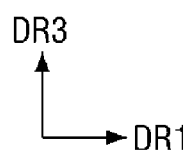

FIG. 3 is a plan view of the side portion and the heat supply portion of FIG. 1.

Referring to FIG. 3, in an embodiment, the heat supply portion 20 disposed on one of one side surface and the other side surface of one side portion 30 may be provided in plural, as described above. In such an embodiment, the plurality of heat supply portions 20 disposed on one of one side surface and the other side surface of one side portion 30 may be arranged in a matrix form. In one embodiment, for example, the plurality of heat supply portions 20 disposed on one of one side surface and the other side surface of one side portion 30 may be arranged in a matrix form with rows in the first direction DR1 and columns in the third direction DR3. Although FIG. 3 shows an embodiment where the plurality of heat supply portions 20 disposed on one of one side surface and the other side surface of one side portion 30 are arranged in a matrix form in a way such that three heat supply portions are arranged along the first direction DR1 and six heat supply portions are arranged along the third direction DR3, the disclosure is not limited thereto. In an embodiment, the heat supply portions 20 adjacent to each other along the first direction DR1 may be in contact with each other, but not being limited thereto. Alternatively, the heat supply portions 20 adjacent to each other along the first direction DR1 may be spaced apart from each other with predetermined intervals.

Figure 4:
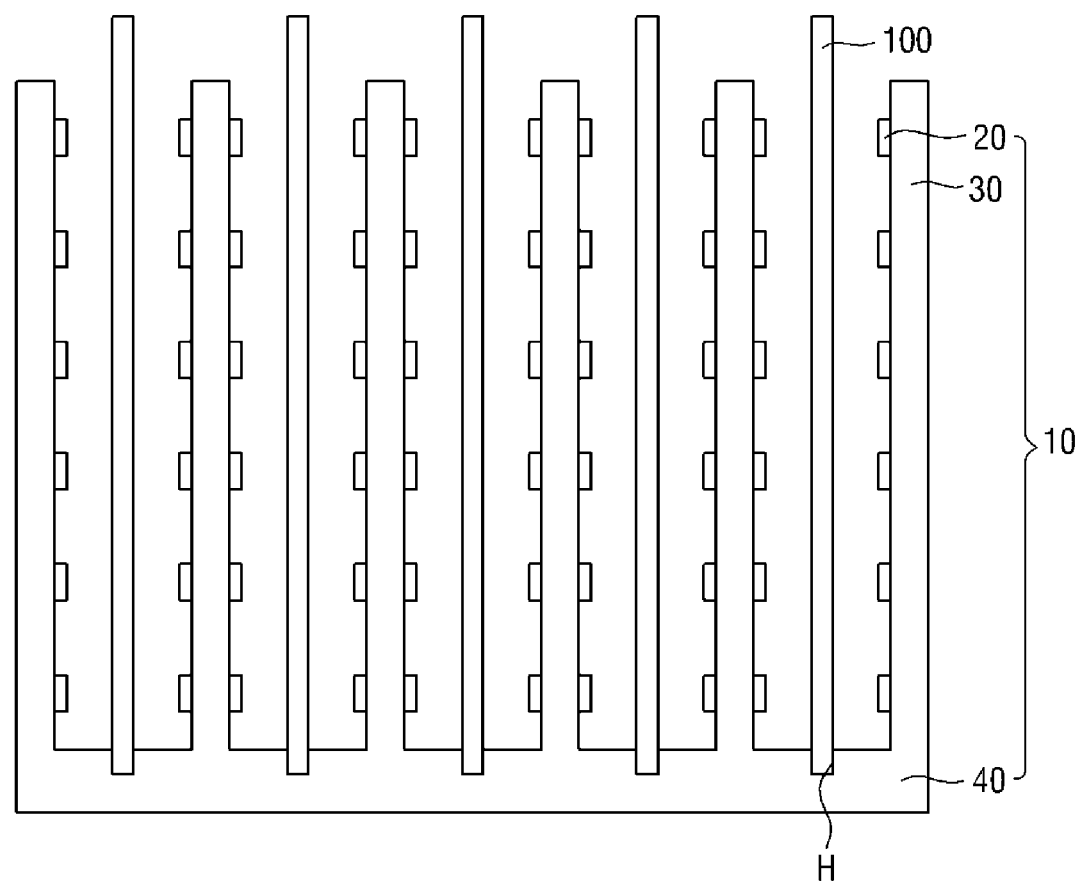
FIG. 4 is a cross-sectional view illustrating the manufacture of a glass article using an apparatus for manufacturing a glass article according to an exemplary embodiment.
Figure 4:
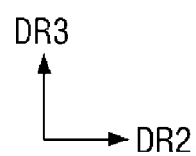

FIG. 4 is a cross-sectional view illustrating the manufacture of a glass article using an apparatus for manufacturing a glass article according to an exemplary embodiment.

Referring to FIG. 4, a glass article 100 may be fitted into and fixed to the groove H of the support portion 40 of the glass article manufacturing apparatus 10. The glass article 100 may be a strengthened glass article. The glass article 100 may be disposed and fixed between the adjacent side portions 30 (between the heat supply portions 20 respectively disposed between the adjacent side portions 30). An indentation depth of the groove H is a depth predetermined to allow the glass article 100 to be fixed therein. In such an embodiment, the corresponding portion of the glass article 100 which is inserted into the groove H may be provided with a less amount of heat from the adjacent heat supply portions 20 and side portions 30 than the remaining portion of the glass article 100 which is not disposed in the groove H. In consideration of effective fixation of the glass article 100 and uniform heat supply to the glass article 100, the indentation depth of the groove H is in a range of about 5% to about 30%, or about 10% to about 20% of the length of the glass article 100 in the third direction DR3.

In an embodiment, in the glass article which has been heat-treated by the glass article manufacturing apparatus 10, the corresponding portion which is inserted into the groove H, which is less heat-treated than the remaining portion, may be cut.

Damage such as dents or cracks may occur on the surface of the strengthened glass article during transportation or due to impurities in molten salt for strengthening on the surface of the strengthened glass article. The damage may reduce the physical properties and/or quality of the glass article. In an embodiment, the glass article manufacturing apparatus 10 including the heat supply portion 20 including a halogen lamp capable of performing rapid heating may perform rapid, high-temperature heat treatment on the glass article, thereby alleviating the damage on the surface of the strengthened glass article. In such an embodiment, in the glass article manufacturing apparatus 10, the side portions 30, which receive heat supply from the heat supply portion 20 and are respectively located on one side and the other side of the glass article, include or are made of a material having high thermal conductivity. Thus, by applying heat in a shorter time over the entire surface of the glass article, the damage may be effectively mitigated.

The heating rate of the glass article manufacturing apparatus 10 may be determined by the heat supply portion 20 and the side portion 30 provided with heat from the heat supply portion 20 to propagate heat. In an embodiment, the heating rate of the glass article manufacturing apparatus 10 may be about 40 K/min or greater, or about 60 K/min or greater, or about 80 K/min or greater, or about 100 K/min or greater. Since the glass article manufacturing apparatus 10 has such a high heating rate, the surface damage of the strengthened glass article can be easily alleviated.

Hereinafter, alternative embodiments of the glass article manufacturing apparatus 10 will be described. The same or like elements in the alternative embodiments have been labeled with the same reference characters as used above to describe the embodiments with reference to FIGS. 1 to 4, and any repetitive detailed description thereof will hereinafter be omitted or simplified.

Figure 5:
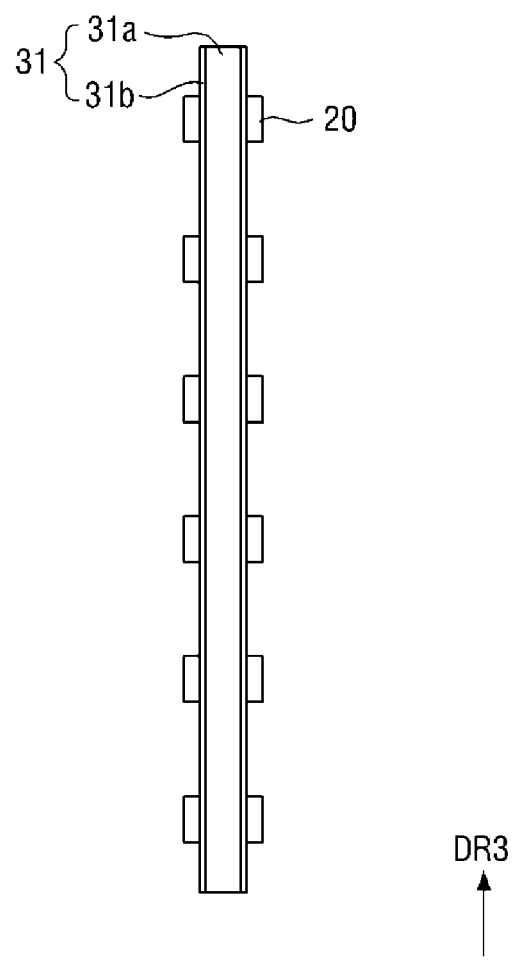
FIG. 5 is a cross-sectional view of a side portion and a heat supply portion according to an alternative exemplary embodiment.

FIG. 5 is a cross-sectional view of a side portion and a heat supply portion according to an alternative exemplary embodiment.

The side portion and the heat supply portion of a glass article manufacturing apparatus shown in FIG. 5 is substantially the same as those of the glass article manufacturing apparatus 10 shown in FIG. 2 except that a side portion 31 is divided into a first side portion 31a and a second side portion 31b.

In an embodiment of the glass article manufacturing apparatus, as shown in FIG. 5, the side portion 31 may be divided into the first side portion 31a and the second side portion 31b.

The first side portion 31a and the second side portion 31b may include different materials from each other. The first side portion 31a may serve to support the second side portion 31b or to provide a support on which the second side portion 31b is disposed. The first side portion 31a may be a plate having low thermal conductivity. Since the first side portion 31a provides a support on which the second side portion 31b is disposed, the material of the first side portion 31a is not limited to any particular material.

The second side portions 31b may be disposed on one side surface and the other side surface of the first side portion 31a, respectively. The second side portion 31b may include at least one of the materials of the side portion 30 listed above with reference to FIGS. 1 to 3. In such an embodiment, the second side portion 31b may include a material having high thermal conductivity.

The planar shape of the first side portion 31a may be substantially the same as the planar shape of the second side portion 31b. As the planar shape of the first side surface portion 31a may be the same as the planar shape of the side portion 30 described above with reference to FIGS. 1 to 3. The planar size of the first side portion 31a may be the same as the planar size of the second side portion 31b.

The second side portion 31b may be disposed on the first side portion 31a via coating or an adhesive, but is not limited thereto.

Figure 6:
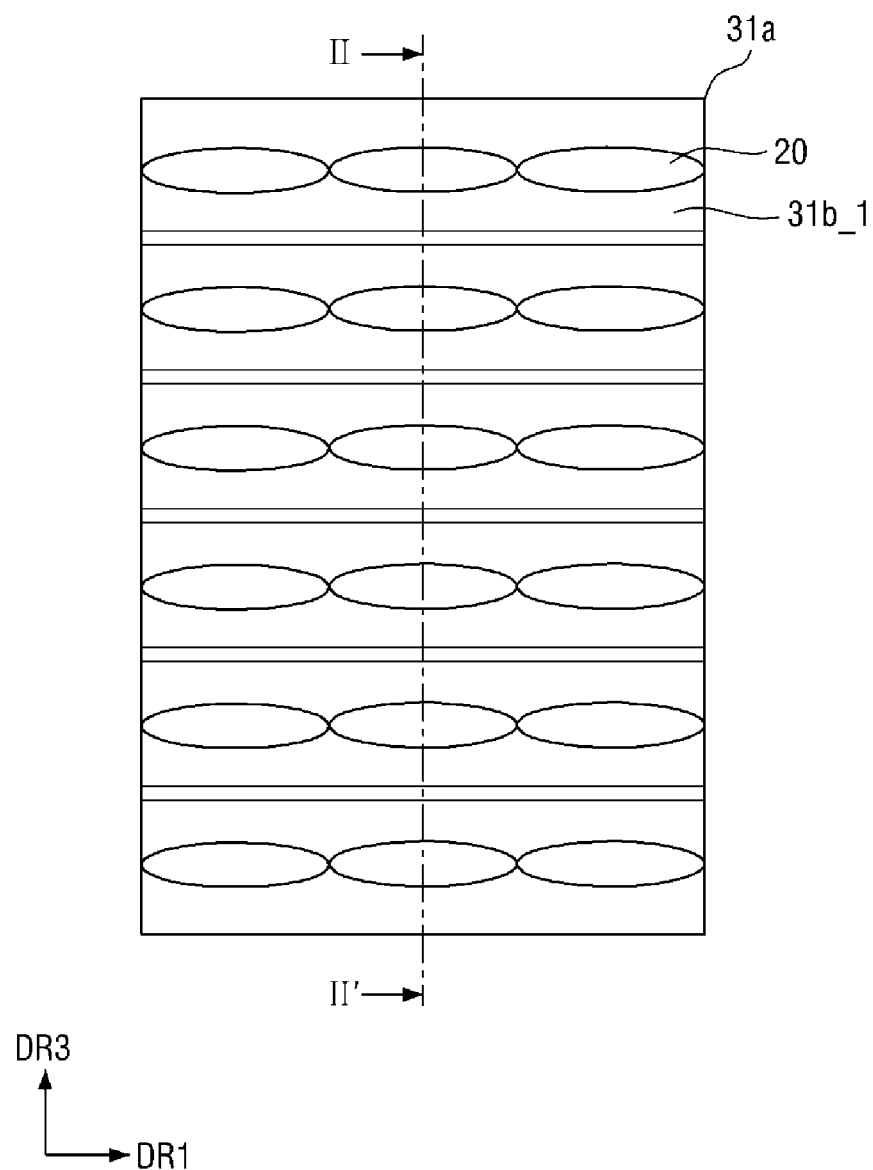
FIG. 6 is a plan view of a side portion and a heat supply portion according to another alternative exemplary embodiment.
Figure 7:
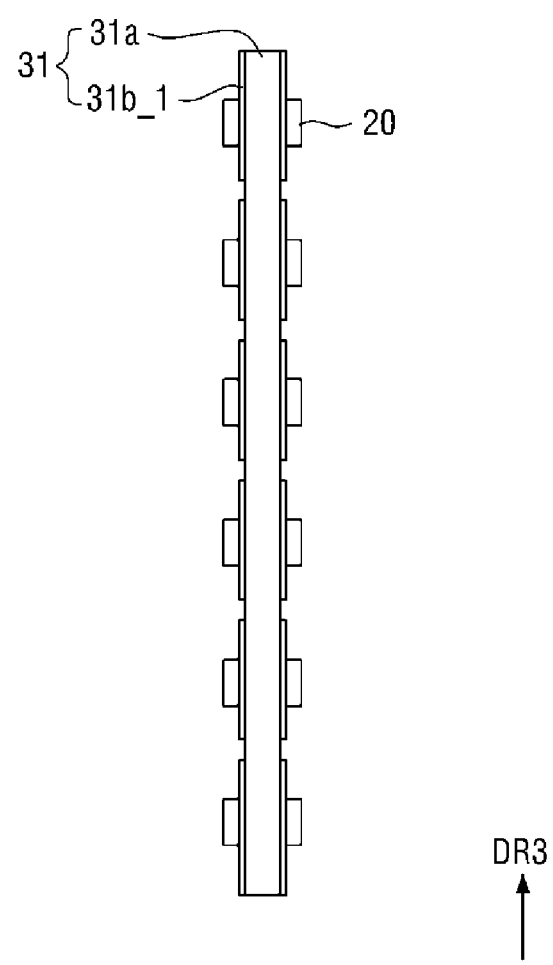
FIG. 7 is a cross-sectional view taken along line II-IP of FIG. 6.

FIG. 6 is a plan view of a side portion and a heat supply portion according to another alternative exemplary embodiment. FIG. 7 is a cross-sectional view taken along line II-IP of FIG. 6.

The side portion and the heat supply portion of a glass article manufacturing apparatus shown in FIGS. 6 and 7 is substantially the same as those of the glass article manufacturing apparatus 20 shown in FIG. 5 except that a second side portion 31b_1 includes a side pattern having a linear shape extending along the first direction DR1, the side pattern is provided in plural, and the adjacent side patterns are spaced apart from each other along the third direction DR3.

In an embodiment, as shown in FIGS. 6 and 7, the second side portion 31b_1 may include a side pattern having a linear shape extending along the first direction DR1, the side pattern may be provided in plural, and the adjacent side patterns may be spaced apart from each other along the third direction DR3.

The side patterns may be disposed to overlap the plurality of heat supply portions 20 arranged along the first direction DR1, respectively.

The heat supply portion 20 disposed on one of the side patterns and the heat supply portion 20 disposed on the other side pattern may operate independently of each other or differently from each other. In such an embodiment, as described above, since the side patterns are spaced apart along the third direction DR3 and the first side portion 31a includes a material having low thermal conductivity, heat supplied from the heat supply portions 20 disposed on different side patterns may not be substantially transferred to the adjacent side patterns.

In an embodiment, when the heat supply portion 20 disposed on one of the side patterns is turned on, the heat supply portion 20 disposed on another side pattern may be turned off. Accordingly, when a certain portion of the strengthened glass article is dented or cracked, the heat supply portion 20 may be operated only in the dented or cracked portion, thereby reducing power consumption.

In one embodiment, for example, the heat supply portion 20 disposed on one of the side patterns and the heat supply portion 20 disposed on another side pattern may be operated at different heating rates from each other.

As will be described later, the heating rate of the heat supply portion may change the viscosity of the glass article to be heat-treated. The increased viscosity of the glass article changed during the heat treatment may affect the glass properties and cause stress relaxation. The stress relaxation may increase resistance to external impact and prevent propagation of cracks generated due to external impact.

Figure 8:
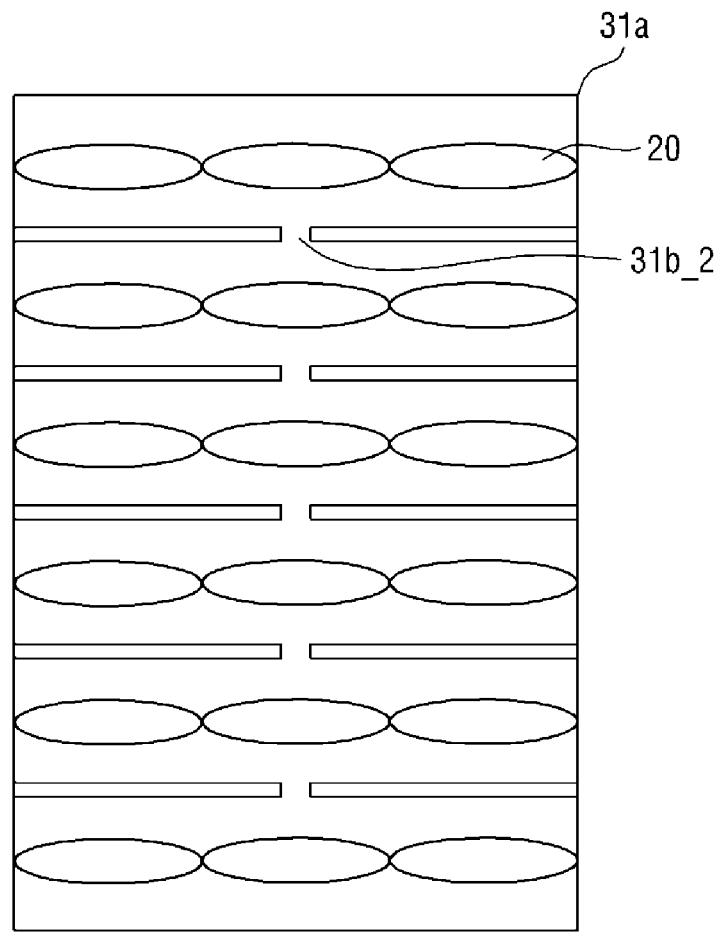
FIG. 8 is a plan view of a side portion and a heat supply portion according to still another alternative exemplary embodiment.
Figure 8:
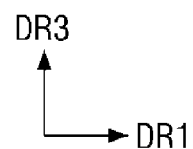

FIG. 8 is a plan view of a side portion and a heat supply portion according to another alternative exemplary embodiment.

The side portion and the heat supply portion of a glass article manufacturing apparatus shown in FIG. 8 is substantially the same as those of the glass article manufacturing apparatus shown in FIGS. 6 and 7 except that the side patterns of second side portions 31b_2 spaced apart from each other along the three direction DR3 are physically connected through a connection portion.

In an embodiment of the glass article manufacturing apparatus, as shown in FIG. 8, the side patterns of second side portions 31b_2 spaced apart from each other along the three direction DR3 may be physically connected through a connection portion.

Although FIG. 8 illustrates an embodiment where the side patterns of the adjacent second side portions 31b_2 are physically connected through one connection portion, the disclosure is not limited thereto. The adjacent second side portions 31b_2 may be physically connected through two or more connection portions.

Figure 9:
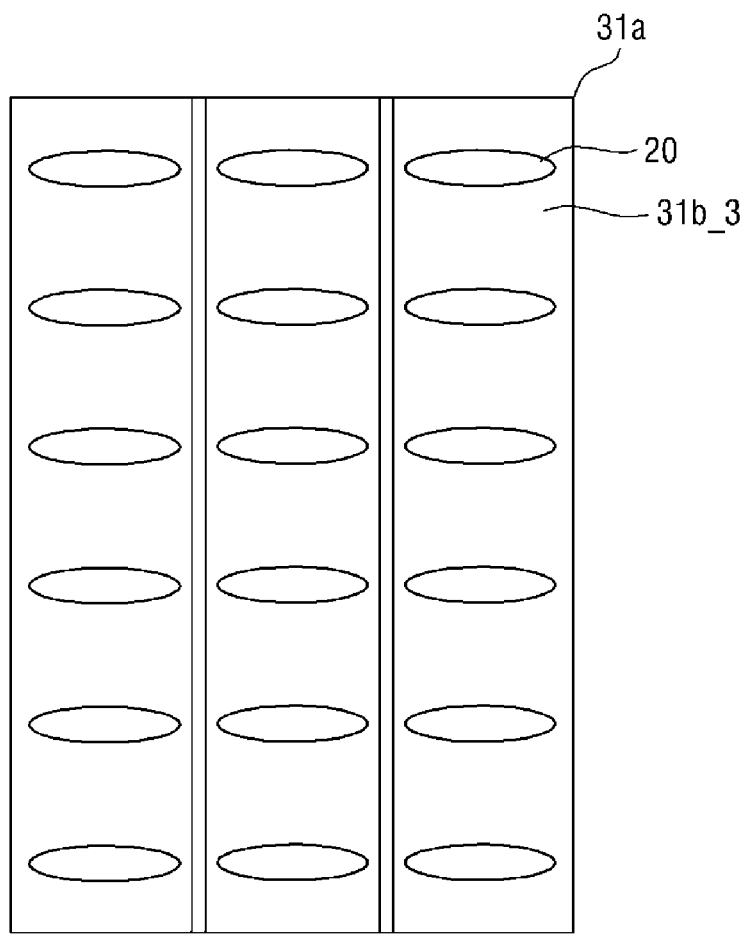
FIG. 9 is a plan view of a side portion and a heat supply portion according to still another alternative exemplary embodiment.
Figure 9:
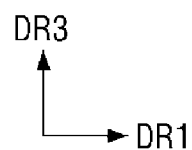

FIG. 9 is a plan view of a side portion and a heat supply portion according to still another alternative exemplary embodiment.

The side portion and the heat supply portion of a glass article manufacturing apparatus shown in FIG. 9 is substantially the same as those of the glass article manufacturing apparatus shown in FIG. 6 except that the extending direction of the side pattern is the third direction DR3.

In an embodiment of the glass article manufacturing apparatus, as shown in FIG. 9, the extending direction of the side pattern of the second side portion 31b_3 may be the third direction DR3, and the plurality of side patterns may be spaced apart from each other along the first direction DR1.

In such an embodiment, other features are the same as those described above with reference to FIG. 6, and thus, any repetitive detailed description thereof will be omitted.

Figure 10:
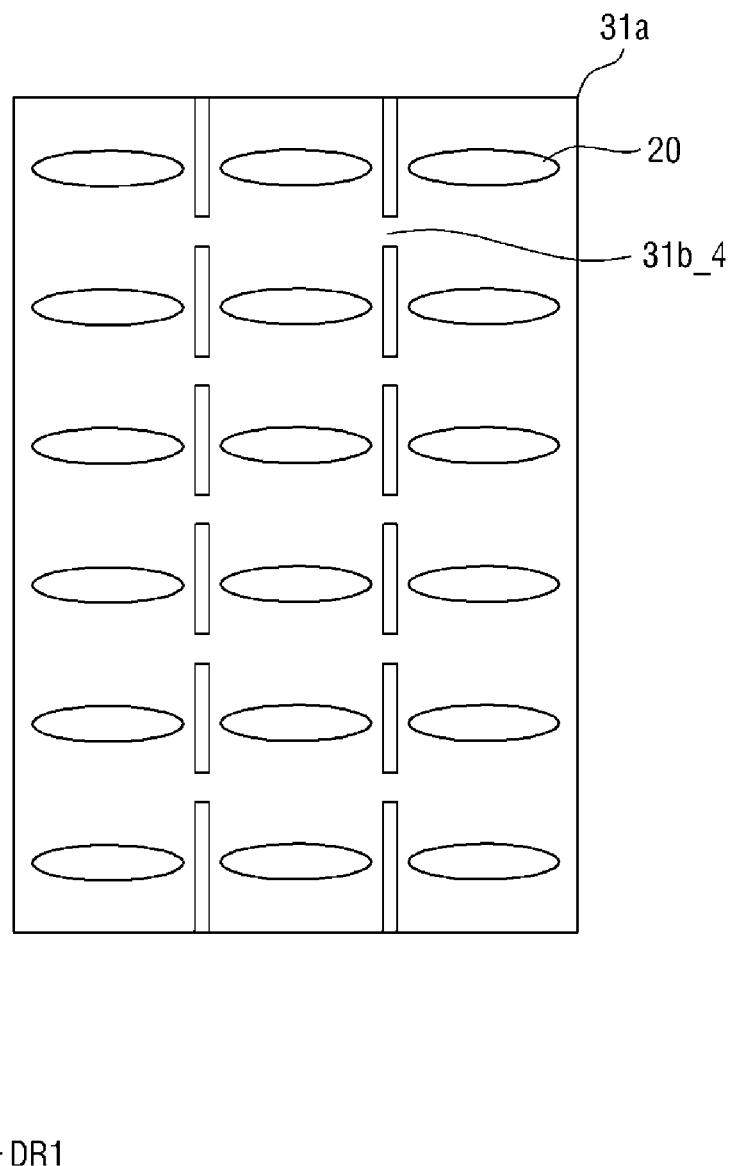
FIG. 10 is a plan view of a side portion and a heat supply portion according to still another alternative exemplary embodiment.

FIG. 10 is a plan view of a side portion and a heat supply portion according to still another alternative exemplary embodiment.

The side portion and the heat supply portion of a glass article manufacturing apparatus shown in FIG. 10 is substantially the same as those of the glass article manufacturing apparatus shown in FIG. 9 except that the side patterns of second side portions 31b_4 spaced apart from each other along the first direction DR1 are physically connected through a connection portion.

In an embodiment of the glass article manufacturing apparatus, as shown in FIG. 10, the side patterns of second side portions 31b_4 spaced apart from each other along the first direction DR1 may be physically connected through a connection portion.

Although FIG. 10 shows an embodiment where the side patterns of the adjacent second side portions 31b_4 are physically connected through two or more connection portions, the disclosure is not limited thereto. Alternatively, the side patterns of the adjacent second side portions 31b_4 may be physically connected through one connection portion.

Figure 11:
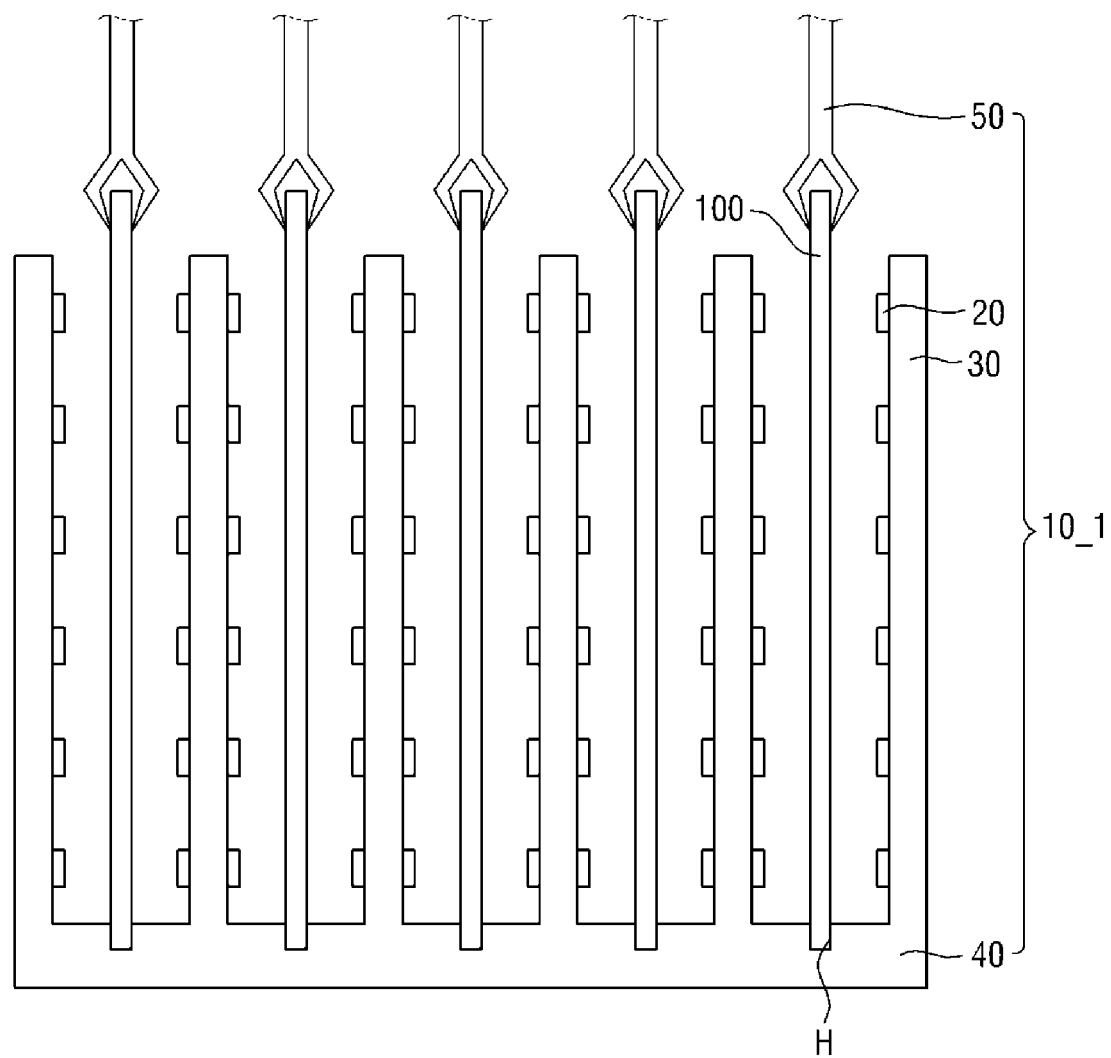
FIG. 11 is a cross-sectional view of a glass article manufacturing apparatus according to still another alternative exemplary embodiment.

FIG. 11 is a cross-sectional view of a glass article manufacturing apparatus according to still another alternative exemplary embodiment.

The glass article manufacturing apparatus 10_1 shown in FIG. 11 is substantially the same as the glass article manufacturing apparatus 10 shown in FIGS. 1 to 3 except that the glass article manufacturing apparatus 10_1 further includes a fixing portion 50 for fixing the strengthened glass article 100 into the groove H of the support portion 40.

In an embodiment, the glass article manufacturing apparatus 10_1 may further include a fixing portion 50 for fixing the strengthened glass article 100 into the groove H of the support portion 40.

The fixing portion 50 may be disposed on the other side opposite to one side of the glass article 100, which is fixed to the groove H. The fixing portion 50 may serve to hold both surfaces of the glass article 100, i.e., one surface facing the adjacent side portions 30 and the other surface opposite to the one surface, thereby fixing the glass article 100 without bending.

Figure 12:
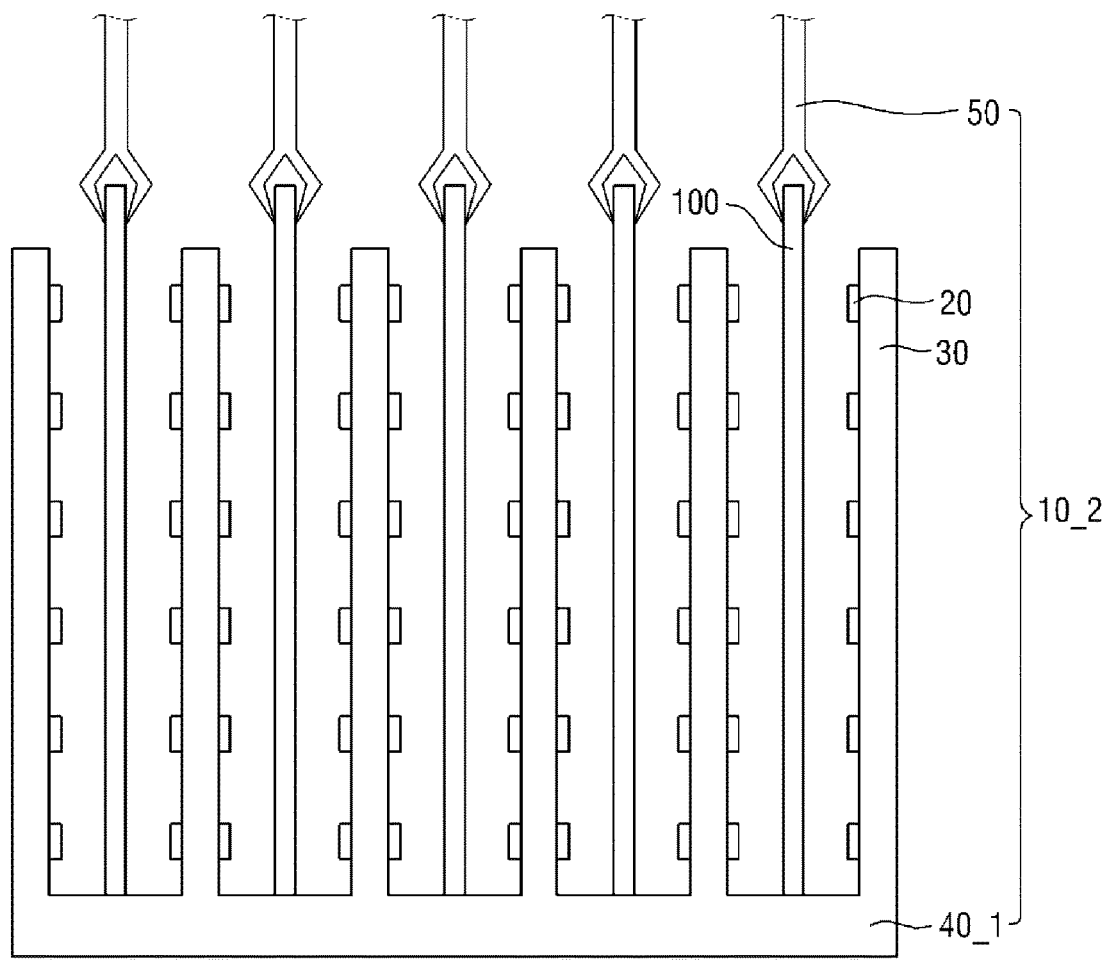
FIG. 12 is a cross-sectional view of a glass article manufacturing apparatus according to still another alternative exemplary embodiment.

FIG. 12 is a cross-sectional view of a glass article manufacturing apparatus according to still another alternative exemplary embodiment.

The glass article manufacturing apparatus 10_2 shown in FIG. 12 is substantially the same as the glass article manufacturing apparatus 10_1 shown in FIG. 11 except that a support portion 40_1 does not include a groove.

In an embodiment of the glass article manufacturing apparatus 10_2, as shown in FIG. 12, the support portion 40_1 may not include a groove. In such an embodiment, the surface of the support portion 40_1 may be flat. The glass article 100 may be placed in an upright position along the thickness direction (third direction DR3) from the surface of the flat support portion 40_1.

Hereinafter, an embodiment of a method for manufacturing a glass article using the glass article manufacturing apparatus described above will be described. The same or like elements in the embodiment of a method for manufacturing a glass article using the glass article manufacturing apparatus have been labeled with the same reference characters as used above to describe the embodiments of the glass article manufacturing apparatus with reference to FIGS. 1 to 12, and any repetitive detailed description thereof will hereinafter be omitted or simplified.

Figure 13:
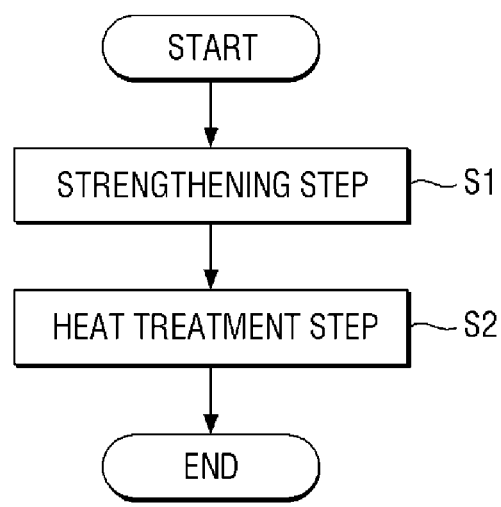
FIG. 13 is a flowchart showing a method for manufacturing a glass article according to an exemplary embodiment.
Figure 14:
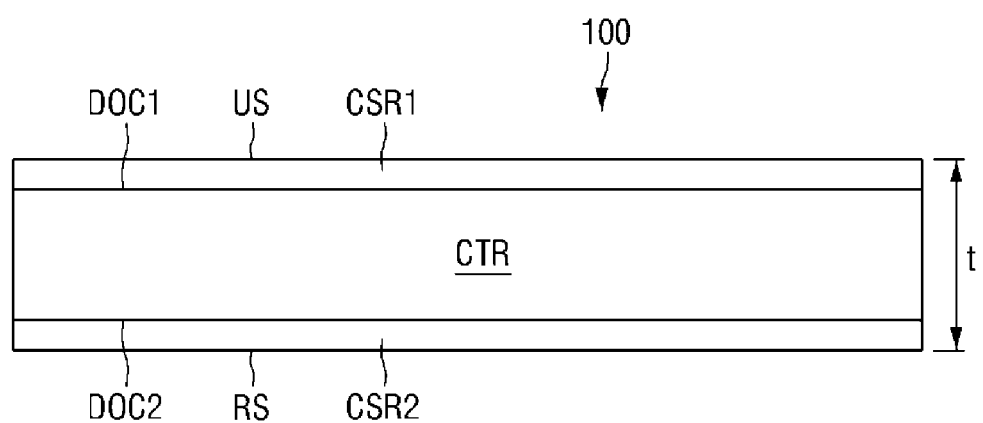
FIG. 14 is a cross-sectional view of a glass article after a strengthening step.
Figure 15:
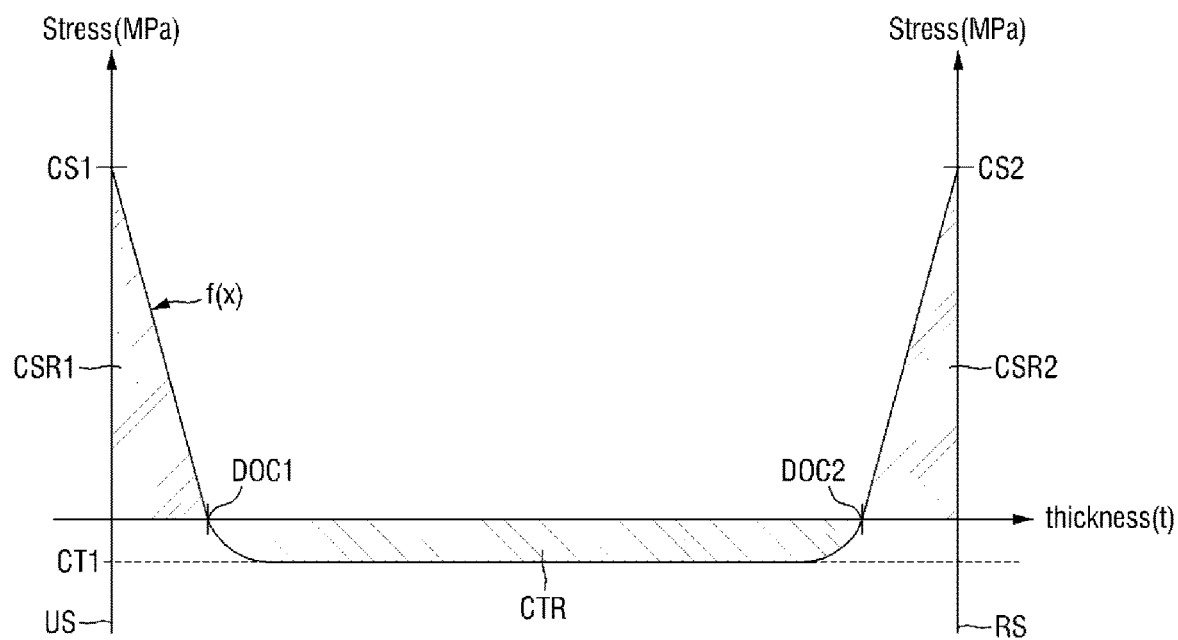
FIG. 15 is a graph showing a stress profile of a glass article after the strengthening step of FIG. 14.
Figure 16:
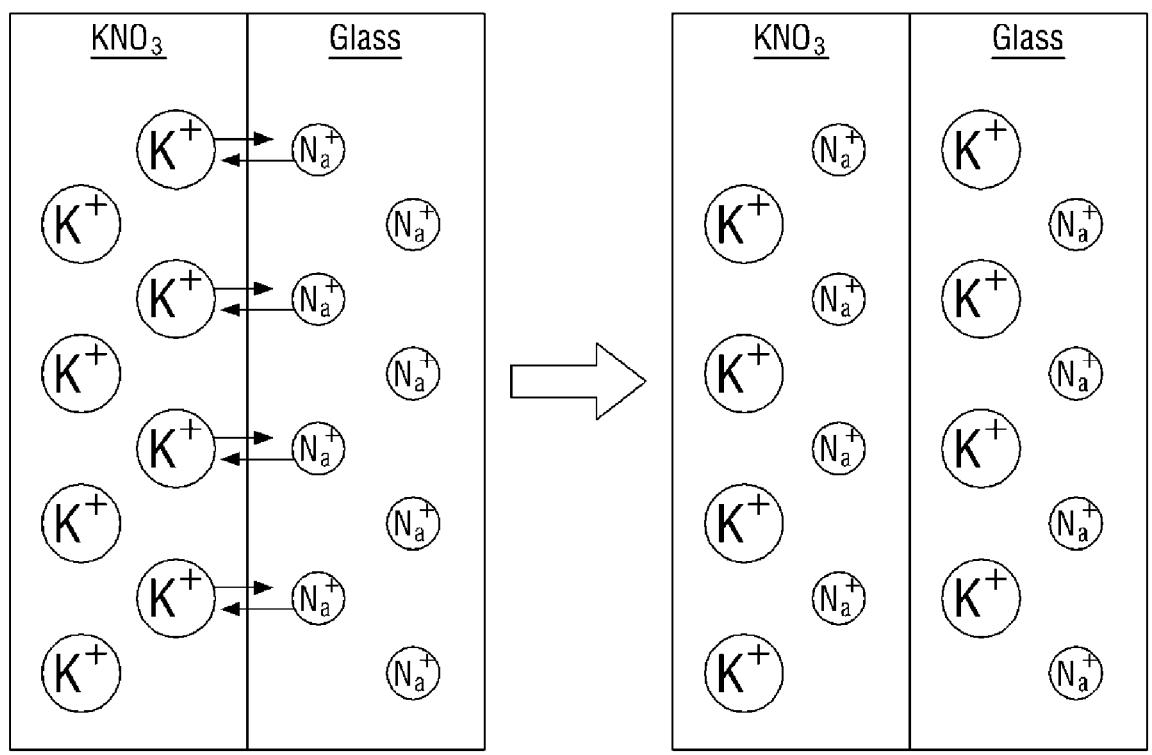
FIG. 16 is a schematic diagram illustrating an ion exchange process according to an exemplary embodiment.
Figure 17:
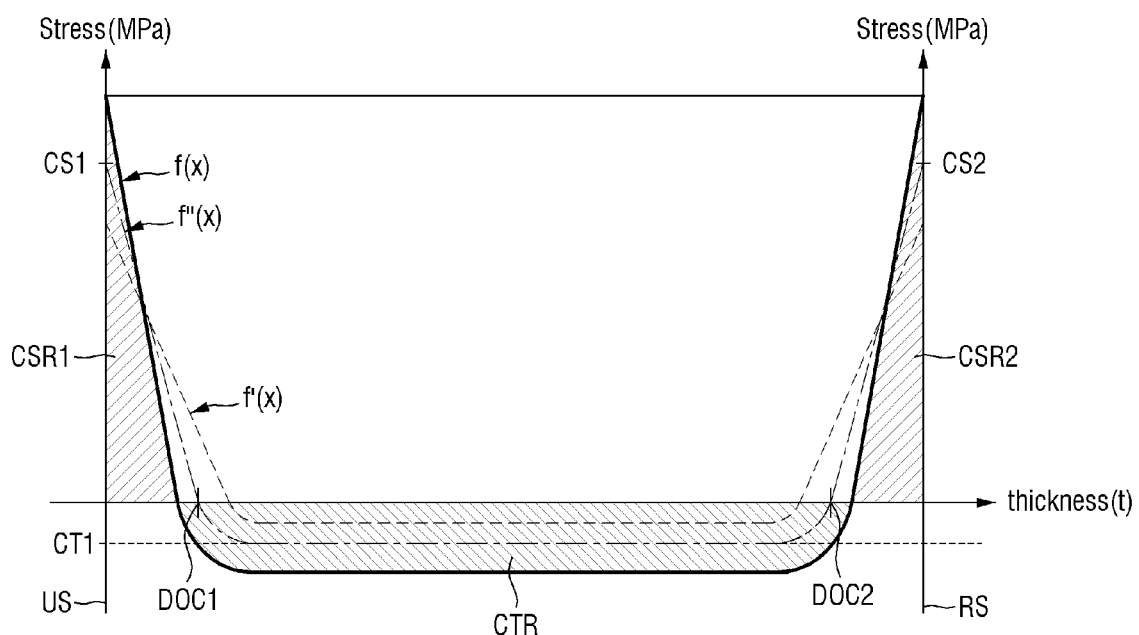
FIG. 17 is a graph showing a stress profile of a glass article after a heat treatment step according to an exemplary embodiment, a stress profile of a glass article before heat treatment, and a stress profile of a glass article after the heat treatment step according to a comparative example.

FIG. 13 is a flowchart showing a method for manufacturing a glass article according to an exemplary embodiment. FIG. 14 is a cross-sectional view of a glass article after a strengthening step. FIG. 15 is a graph showing a stress profile of a glass article after the strengthening step of FIG. 14. FIG. 16 is a schematic diagram illustrating an ion exchange process according to an exemplary embodiment. FIG. 17 is a graph showing a stress profile of a glass article after a heat treatment step according to an exemplary embodiment, a stress profile of a glass article before heat treatment, and a stress profile of a glass article after the heat treatment step according to a comparative example.

Referring to FIGS. 13 to 17 and 4, an embodiment of the method of manufacturing a glass article may include strengthening a glass article, i.e., strengthening step, (S1), and performing a heat treatment on the strengthened glass article, i.e., heat treatment, step (S2). Before the strengthening step S1 of the glass article, a molding step, a cutting step, and a polishing step may be further performed.

The molding step may include preparing a glass composition and molding the glass composition.

The glass composition may include various compositions known in the art. In an exemplary embodiment, the glass composition may include a lithium-alumina-silicon ("LAS") glass ceramic containing lithium aluminosilicate. In one embodiment, for example, the glass composition may contain 50 to 80 mol % of $SiO_2$, 1 to 30 mol % of $Al_2O_3$, 0 to 5 mol % of $B_2O_3$, 0 to 4 mol % of $P_2O_5$, 3 to 20 mol % of $Li_2O$, 0 to 20 mol % of $Na_2O$, 0 to 10 mol % of $K_2O$, 3 to 20 mol % of MgO, 0 to 20 mol % of CaO, 0 to 20 mol % of SrO, 0 to 15 mol % of BaO, 0 to 10 mol % of ZnO, 0 to 1 mol % of $TiO_2$, and 0 to 8 mol % of $ZrO_2$.

The term "content is 0 mol %" as used herein means that it does not substantially contain the corresponding component. The term "(composition) does not substantially contain (a certain component)" as used herein means that the certain component is not intentionally contained in raw materials and the like, and includes, for example, a case where a tiny amount (e.g., 0.1 mol % or less) of impurities are inevitably contained.

Hereinafter, each component of the glass composition will be described in detail. In the glass composition, $SiO_2$ constitutes the skeleton of glass, may increase the chemical durability, and may serve to reduce the occurrence of cracks when scratches (indentations) are made on the glass surface. In an embodiment, $SiO_2$ may be contained in an amount of about 50 mol % or greater to effectively form the framework of glass, increase chemical durability, and reduce generation of cracks. In such an embodiment, $SiO_2$ may be contained in the glass composition in an amount of about 80 mol % or less to exhibit sufficient meltability.

$Al_2O_3$ serves to improve the breakage resistance of glass. That is, $Al_2O_3$ may serve to generate a smaller number of fragments when the glass is broken. In addition, $Al_2O_3$ may serve as an active component that improves the ion exchange performance during chemical strengthening and increases surface compressive stress after strengthening. In an embodiment, the content of $Al_2O_3$ is about 1 mol % or greater, such that the above-described function may be effectively performed. In such an embodiment, the content of $Al_2O_3$ is about 30 mol % or less to maintain the acid resistance and meltability of glass.

$B_2O_3$ enhances the chipping resistance of glass and improves the meltability of glass. In an embodiment, $B_2O_3$ may be omitted (0 mol %). Alternatively, $B_2O_3$ may be contained in an amount of about 0.5 mol % or greater to further improve the meltability of glass. In such an embodiment, $B_2O_3$ may be contained in an amount of about 5 mol % or less to suppress the occurrence of striae during melting.

$P_2O_5$ improves the ion exchange performance and chipping resistance. In an embodiment, $P_2O_5$ may be omitted (0 mol %). Alternatively, $P_2O_5$ may be contained in an amount of about 0.5 mol % or greater to effectively perform the above-described function. In such an embodiment, $P_2O_5$ may be contained in an amount of about 4 mol % or less to prevent a significant decrease in breakage resistance and acid resistance.

$Li_2O$ serves to form surface compressive stress by ion exchange. Li ions near the glass surface may be exchanged with Na ions or the like through an ion exchange process. $Li_2O$ may also serve to improve the breakage resistance of glass. The content of $Li_2O$ for effective ion exchange is about 3 mol % or greater, and the content of $Li_2O$ may be 20 mol % or less for effective acid resistance.

$Na_2O$ serves to form surface compressive stress by ion exchange and improve the meltability of glass. Na ions near the glass surface may be exchanged with K ions or the like through an ion exchange process. In an embodiment, $Na_2O$ may be omitted (0 mol %). Alternatively, the content of $Na_2O$ may be 1 mol % or greater to effectively perform the above-described role. In an embodiment, where only a Li and Na ion exchange process is performed and a K ion exchange process is not performed, the content of $Na_2O$ may be about 8 mol % or less for smooth Li and Na ion exchange. In an embodiment, where a K ion exchange process is also performed, a larger amount of $Na_2O$ may be used. However, in such an embodiment, the content of $Na_2O$ may be about 20 mol % or less for effective acid resistance.

$K_2O$ improves the ion exchange performance and is associated with the breakage resistance. In an embodiment, $K_2O$ may be omitted (0 mol %). Alternatively, $K_2O$ may be contained in an amount of about 0.5 mol % or greater to improve the ion exchange performance. In such an embodiment, the content of $K_2O$ may be about 10 mol % or less to prevent an excessive decrease in breakage resistance.

MgO serves to increase the surface compressive stress and improve the breakage resistance of chemically strengthened glass. In an embodiment, the content of MgO is about 3 mol % or greater to effectively increase the surface compressive stress and improve the breakage resistance of chemically strengthened glass. In such an embodiment, MgO may be contained in an amount of about 20 mol % or less to reduce the occurrence of devitrification during glass melting.

CaO serves to improve the meltability and breakage resistance of glass. In an embodiment, CaO may be omitted (0 mol %). Alternatively, CaO may be contained in a content of about 0.5 mol % or greater to effectively improve the meltability and breakage resistance of glass. If the content of CaO is excessively high, the ion exchange performance may be degraded, and thus, the content of CaO may be about 20 mol % or less.

SrO serves to improve the meltability and breakage resistance of glass, similarly to CaO. In an embodiment, SrO may be omitted (0 mol %). Alternatively, SrO may be contained in an amount of about 0.5 mol % or greater to effectively improve the meltability and breakage resistance of glass. If the content of SrO is excessively high, the ion exchange performance may be degraded, and thus, the content of SrO may be about 20 mol % or less.

BaO serves to improve the meltability and breakage resistance of glass. In an embodiment, BaO may be omitted (0 mol %). Alternatively, BaO may be contained in an amount of about 0.5 mol % or greater to effectively improve the meltability and breakage resistance of glass. In such an embodiment, BaO may be contained in an amount of about 15 mol % or less to prevent an excessive decrease in ion exchange performance.

ZnO serves to improve the meltability of glass. In an embodiment, ZnO may be omitted (0 mol %). Alternatively, a ZnO may be contained in an amount of about 0.25 mol % or greater. In such an embodiment, the content of ZnO may be about 10 mol % or less to prevent a decrease in weatherability.

$TiO_2$ improves the breakage resistance of chemically strengthened glass. In an embodiment, $TiO_2$ may be omitted (0 mol %). Alternatively, a $TiO_2$ may be contained in an amount of about 0.1 mol % or greater to effectively improve the breakage resistance. In such an embodiment, the content of $TiO_2$ may be about 1 mol % or less to prevent devitrification during melting.

$ZrO_2$ may increase the surface compressive stress due to ion exchange and improve the breakage resistance of glass. In an embodiment, $ZrO_2$ may be omitted (0 mol %). Alternatively, $ZrO_2$ may be contained in an amount of about 0.5 mol % or greater to effectively increase the surface compressive stress and the breakage resistance of glass. In such an embodiment, $ZrO_2$ may be contained in an amount of about 8 mol % or less to suppress devitrification during melting.

The glass composition may further include components such as $Y_2O_3$, $La_2O_3$, $Nb_2O_5$, $Ta_2O_5$ and $Gd_2O_3$ in addition to the components described above. The composition of the glass article 100 may be changed through a molding process, an ion exchange process, and the like, which will be described later.

The glass composition described above may be molded into a plate glass shape by at least one of various methods known in the art. In one embodiment, for example, the glass composition may be molded by a float process, a fusion draw process, a slot draw process, or the like.

The glass molded into a flat plate shape may be cut through a cutting step. The glass molded into a flat plate shape may have a different size than that of a final glass article. Cutting of the glass may be performed using a cutting knife, a cutting wheel, a laser, or the like.

The cutting step of glass may be performed before the strengthening step S1 of glass. Glass of a mother substrate may be strengthened at once and then cut into the size of the final glass article. However, in this case, the cut surface (e.g., side surface of glass) may not be in a strengthened state. Accordingly, in an embodiment, the strengthening step S1 may be performed after cutting is completed.

Between the cutting step and the strengthening step S1 of glass, a polishing step may be performed before strengthening. The polishing step may include a side polishing step and a surface polishing step before strengthening. After the side polishing step is performed first, a surface polishing step may be performed before strengthening, but the order of such processes may be variously modified, e.g., reversed.

The side polishing step is a step of polishing the side surface of the cut glass. In the side polishing step, the side surface of the glass is polished to have a smooth surface.

Further, each side surface of the glass may have a uniform (even or smooth) surface through the side polishing step. The side polishing step may be performed simultaneously on a plurality of cut glass pieces. The side polishing step may be performed by a mechanical polishing method or a chemical mechanical polishing method using a polishing apparatus.

The surface polishing step before strengthening may be performed such that each glass piece has a uniform surface. The surface polishing step before strengthening may be performed separately for each cut glass piece. However, in an embodiment where the chemical mechanical polishing apparatus is sufficiently large compared to the glass, the plurality of glass pieces may be horizontally arranged and then surface-polished simultaneously.

After the polishing step before strengthening, the strengthening step S1 is performed. The strengthening step S1 may include chemical strengthening and/or thermal strengthening. In an embodiment where the glass has a thin thickness of 2 mm or less, particularly, about 0.75 mm or less, a chemical strengthening method may be used for precise stress profile control. hereinafter, for convenience of description, embodiments where a chemical strengthening method is used for the strengthening step S1 of glass will be describe in detail.

Chemical strengthening may be performed through an ion exchange process. The ion exchange process is a process of exchanging ions in glass with other ions. By performing the ion exchange process, the ions at or near the surface of the glass can be replaced or exchanged with larger ions having the same valence or oxidation state. In on embodiment, for example, where the glass contains a monovalent alkali metal such as Li+, Na+, K+ and Rb+, the monovalent cation on the surface may be replaced by Na+, K+, Rb+, or Cs+ ions with a larger ionic radius. The ion exchange process will be described in detail with reference to FIG. 16. Referring to FIG. 16, when the glass containing sodium ions is exposed to potassium ions by, for example, immersing the glass in a molten salt bath containing potassium nitrate, sodium ions in the glass are discharged to the outside and the potassium ions may replace sodium ions. The exchanged potassium ions generate compressive stress because potassium ions have a larger ionic radius than sodium ions. The greater the amount of potassium ions exchanged is, the greater the compressive stress become. Since the ion exchange takes place through the surface of the glass, the amount of potassium ions on the glass surface is the greatest. Although some of the exchanged potassium ions may diffuse into the glass to increase the depth of a compressive region, i.e., a compression depth, the amount may generally decrease as it goes away from the surface. Thus, the glass may have a stress profile that has the greatest compressive stress on the surface and decreases as being toward the inside. However, embodiments are not limited thereto. The stress profile may be modified depending on the temperature, processing time, the number of times, presence or absence of heat treatment and/or the like of the ion exchange process.

The strengthened glass article 100 formed through the chemical strengthening may include a first surface US, a second surface RS and a side surface as shown in FIG. 14. In the glass article 100 having a flat plate shape, the first surface US and the second surface RS are main surfaces having a large area, and the side surface is an outer surface connecting the first surface US with the second surface RS.

The first surface US and the second surface RS are opposed to each other in the thickness direction. In an embodiment, where the glass article 100 is used as a cover window of a display device, that is, the glass article 100 serves to transmit light, the light may be mainly incident on one of the first surface US and the second surface RS and pass through the other one.

A thickness t of the glass article 100 is defined as a distance between the first surface US and the second surface RS. In an embodiment, the thickness t of the glass article 100 may be in a range, but is not limited to, of about 0.1 mm to about 2 mm. In such an embodiment, the thickness t of the glass article 100 may be about 0.8 mm or less. In such an embodiment, the thickness t of the glass article 100 may be about 0.75 mm or less. In such an embodiment, the thickness t of the glass article 100 may be about 0.7 mm or less. In such an embodiment, the thickness t of the glass article 100 may be about 0.6 mm or less. In such an embodiment, the thickness t of the glass article 100 may be about 0.65 mm or less. In such an embodiment, the thickness t of the glass article 100 may be about 0.5 mm or less. In yet another embodiment, the thickness t of the glass article 100 may be about 0.3 mm or less. In an embodiment, the thickness t of the glass article 100 may be in range of about 0.45 mm to about 0.8 mm or of about 0.5 mm to about 0.75 mm. The glass article 100 may have a uniform thickness t, but is not limited thereto. Alternatively, the glass article 100 may have a different thickness t for each region.

The glass article 100 may be strengthened to have a predetermined stress profile therein. The strengthened glass article 100 more efficiently prevents generation of cracks, propagation of cracks, breakage and the like due to external impact than the glass article 100 before strengthening. The glass article 100 strengthened by a strengthening process may have a different stress for each region. In one embodiment, for example, compressive regions CSR1 and CSR2 to which a compressive stress is applied may be disposed in the vicinity of the surface of the glass article 100, i.e., near the first surface US and the second surface RS, and a tension region CTR to which a tensile stress is applied may be disposed inside the glass article 100. A boundary between the compressive region CSR1, CSR2 and a tensile region CTR may have a stress value of zero. The compressive stress in one compressive region CSR1, CSR2 may have a different stress value depending on the position (i.e. depth from the surface). Also, the tensile region CTR may have a different stress value depending on the depth from the surface US, RS.

FIG. 15 is a graph showing the stress profile of the strengthened glass article 100 which is expressed as a function f(x). An X-axis represents the thickness t direction of the glass article 100. In FIG. 15, the compressive stress has positive values, while the tensile stress has negative values. Herein, the magnitude of the compressive/tensile stress means the magnitude of an absolute value regardless of its type or sign.

Referring to FIG. 15, the strengthened glass article 100 includes a first compressive region CSR1 extending from the first surface US to a point at a first depth (first compression depth DOL1), and a second compressive region CSR2 extending from the second surface RS to a point at a second depth (second compression depth DOL2). The tensile region CTR is disposed between the first and second compressive regions CRR1 and CSR2 or between the first compression depth DOL1 and the second compression depth DOL2. Although not shown in FIG. 15, a compressive region and a tensile region may be disposed between opposed side surfaces of the glass article 100 in a similar manner.

The first compressive region CSR1 and the second compressive region CSR2 are resistant to an external impact to suppress the occurrence of cracks or breakage of the glass article 100. In such an embodiment, the greater the maximum compressive stress CS1, CS2 of the first and second compressive regions CSR1, CSR2 is, the greater the strength of the glass article 100 become. Since an external impact is usually transmitted through the surfaces US, RS and SS of the glass article 100, the glass article 100 may have the maximum compressive stresses CS1 and CS2 at the surfaces US, RS and SS thereof to improve durability. In such an embodiment, the glass article 100 may have the maximum tensile stress CT1 at a center portion thereof. The maximum compressive stresses CS1 and CS2 of the first and second compressive regions CSR1 and CSR2 may be about 700 megapascals (Mpa) or greater. In one embodiment, for example, the maximum compressive stresses CS1 and CS2 of the first and second compressive regions CSR1 and CSR2 may be in a range of about 800 MPa to about 1,050 MPa. In such an embodiment, the maximum compressive stresses CS1 and CS2 of the first and second compressive regions CSR1 and CSR2 may be in a range of about 850 MPa to about 1,000 MPa.

The first compression depth DOL1 and the second compression depth DOL2 suppress cracks or grooves formed in the first and second surfaces US and RS from propagating to the tensile region CTR inside the glass article 100. In an embodiment, the first and second compression depths DOC1 and DOC2 are effectively larger, such that propagation of cracks and the like may be effectively prevented.

The first and second compression depths DOL1 and DOL2 may be in a range of about 20 micrometers (μm) to about 150 μm. In an embodiment, the first and second compression depths DOL1 and DOL2 may be in a range of about 50 μm to about 100 μm. In one embodiment, for example, the first and second compression depths DOL1 and DOL2 may be in a range of about 70 μm to about 85 μm.

In embodiments, although not limited thereto, the first and second compression depths DOL1 and DOL2 may satisfy the following relationship with respect to the thickness t of the glass article 100:

$$DOL1, DOL2 \geq 0.1*t \qquad \text{[Mathematical Expression 1]}$$

Referring to FIGS. 10 and 13, after the strengthening step S1, the strengthened glass article 100 is heat-treated (step S2). The heat treatment step S2 may include placing the strengthened glass article 100 between the adjacent side portions 30 of the glass article manufacturing apparatus 10, and operating the heat supply portion 20 of the glass article manufacturing apparatus 10 to heat up the glass article manufacturing apparatus 10 to heat-treat the strengthened glass article 100.

When placing the strengthened glass article 100 between the adjacent side portions 30 of the glass article manufacturing apparatus 10, the glass article 100 may be fixed by the groove H of the glass article manufacturing apparatus 10. As described above, the groove H is disposed between the adjacent side portions 30, and the separation distance from the groove H to the adjacent side portion 30 located on one side and the separation distance from the groove H to the adjacent side portion 30 located on the other side may be equal to each other.

In the step (or process) of operating the heat supply portion 20 to heat up the glass article manufacturing apparatus 10 to heat-treat the strengthened glass article 100, heat may be supplied through the heat supply portion 20 and the side portion 30 including the thermally conductive material and supplied with heat through the heat supply portion 20. In such an embodiment, since the groove H into which the strengthened glass article 100 is fixed is disposed between the adjacent side portions 30, and the separation distance from the groove H to the adjacent side portion 30 located on one side and the separation distance from the groove H to the adjacent side portion 30 located on the other side are equal to each other, one surface and the other surface of the strengthened glass article 100 fixed into the groove H may be heat-treated uniformly by receiving uniform heat from the side portion 30 and the heat supply portion 20 adjacent to one side, and the side portion 30 and the heat supply portion 20 adjacent to the other side, respectively.

In such an embodiment, as described above, in the glass article manufacturing apparatus 10, the heat supply portion 20 includes a halogen lamp capable of performing rapid heating, and the side portions 30, which receive heat supply from the heat supply portion 20 and are respectively located on one side and the other side of the glass article, includes or are made of a material having high thermal conductivity. Thus, rapid heat treatment may be performed over the entire surface of the strengthened glass article 100.

In an embodiment, as described above, damage such as dents or cracks may occur on the surface of the strengthened glass article during transportation or due to impurities in molten salt for strengthening on the surface of the strengthened glass article. In an embodiment, where the glass article is an ultra-thin glass article having a thickness in a ranging of about 30 μm to about 80 μm, an upper part, which is not fixed during chemical strengthening, may be bent to come into contact with adjacent materials, and impurities may remain on the surface thereof. Such damage or impurity residues may be reduced through the heat treatment step S2.

The step of operating the heat supply portion 20 to heat up the glass article manufacturing apparatus 10 to heat-treat the strengthened glass article 100 may be performed at an average temperature of about 530° C. for 3 hours. Typically, heat treatment of chemically strengthened glass may degrade the mechanical properties such as compressive stress or strength (strength obtained by a ball-on-ring ("BOR") test or bending strength test) of the surface. However, in an embodiment of the method for manufacturing a glass article using the glass article manufacturing apparatus 10 according to the invention, by rapidly heat-treating the strengthened glass article 100 in a short time, the degradation of the mechanical properties such as compressive stress and strength, which typically occur in heat treatment after strengthening, may be substantially reduced.

This will be described in greater detail with reference to FIG. 17.

In FIG. 17, f(x) is a graph of a function representing the stress profile of the strengthened glass article 100 before the heat treatment (Comparative Example 1), f(x)' is graph of a function representing the stress profile of the glass after heat-treating the strengthened glass at a heating rate of about 10 K/min to about 30 K/min through a conventional furnace (Comparative Example 2), and f(x)" is graph of a function representing the stress profile of the glass after heat-treating the strengthened glass article 100 by the manufacturing method according to an exemplary embodiment (Experimental Example 1).

As shown in FIG. 17, it can be seen that in the case of Comparative Example 2, the compressive stress value is reduced more greatly on the surface of the glass than Comparative Example 1. On the other hand, in the case of Experimental Example 1, it can be seen that the reduced surface compressive stress value is not larger than that of Comparative Example 2. This is because the glass transition temperature is increased by performing rapid heat treatment on the strengthened glass article 100 in a short time, and the degradation of the mechanical properties such as compressive stress or strength due to heat treatment after strengthening is substantially reduced.

Hereinafter, an embodiment of the glass article manufactured by the method for manufacturing a glass article will be described. The same or like elements of such an embodiment of the glass article manufactured by the method described herein have been labeled with the same reference characters as used above to described embodiments of the glass article, and any repetitive detailed description thereof will hereinafter be omitted or simplified.

Figure 18:
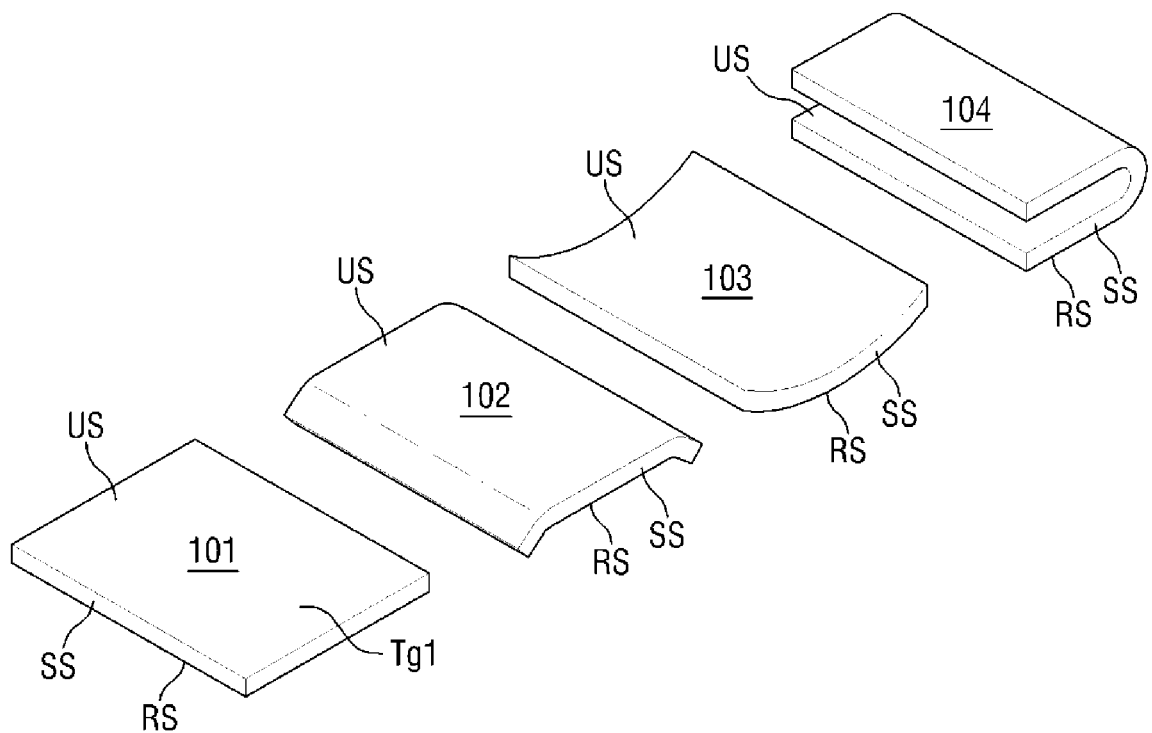
FIG. 18 is a perspective view of a glass article according to various embodiments.
Figure 19:
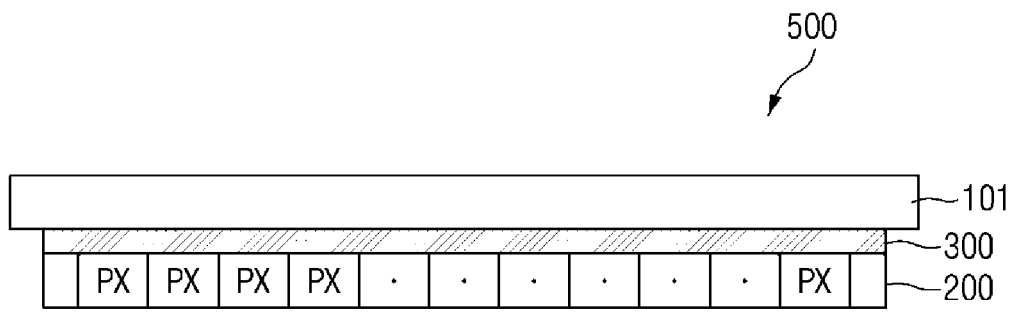
FIG. 19 is a cross-sectional view illustrating an exemplary embodiment in which a glass article is applied to a cover window of a display device.

FIG. 18 is a perspective view of a glass article according to various embodiments. FIG. 19 is a cross-sectional view illustrating an exemplary embodiment in which a glass article is applied to a cover window of a display device.

Referring to FIGS. 18 and 19, in an embodiment, the glass article 101 may have a flat sheet shape or a flat plate shape. In an alternative embodiment, the glass article 102, 103 or 104 may have a three-dimensional shape including bent portions. In one embodiment, for example, the edges of the flat portion may be bent (glass article 102), or the flat portion may be entirely curved (glass article 103) or folded (glass article 104).

In an embodiment, as shown in FIG. 18, the planar shape of the glass article 101 to 104 may be a rectangular shape, but is not limited thereto. Alternatively, the planar shape of the glass article may have one of various shapes such as a rectangular shape with rounded corners, a square shape, a circular shape, and an elliptical shape. Hereinafter, for convenience of description, embodiments, where the glass article 100 is a flat plate having a rectangular planar shape will be described in detail, but the disclosure is not limited thereto.

In an embodiment, the glass article 101 may be a glass article heat-treated at a heating rate of about 40 kelvin per minute (K/min) or greater by the manufacturing method described above. A glass transition temperature of such an embodiment of the glass article 101 may be higher than a glass transition temperature of a glass article heat-treated at a heating rate of about 10 K/min.

In an embodiment, as shown in FIG. 19, the glass article may be a cover window of a display device 500. In such an embodiment, the display device 500 may include a display panel 200, the cover window 100 disposed on the display panel 200, and an optically transparent bonding layer 300 disposed between the display panel 200 and the cover window 100 to bond the display panel 200 and the cover window 100 to each other.

Such an embodiment of the display panel 200 may include not only a self-luminous display panel such as an organic light emitting display ("OLED") panel, an inorganic electroluminescence ("EL") display panel, a quantum dot ("QED") display panel, a micro-light emitting diode ("LED") display panel, a nano-LED display panel, a plasma display panel ("PDP"), a field emission display ("FED") panel and a cathode ray tube ("CRT") display panel, but also a light receiving display panel such as a liquid crystal display ("LCD") panel and an electrophoretic display ("EPD") panel.

The display panel 200 includes a plurality of pixels PX and may display an image by using light emitted from each pixel PX. The display device 500 may further include a touch member (not shown). In an embodiment, the touch member may be embedded in the display panel 200. In one embodiment, for example, the touch member is directly formed on a display member of the display panel 200, such that the display panel 200 itself may perform a touch function. In an alternative embodiment, the touch member may be manufactured separately from the display panel 200 and then attached to the top surface of the display panel 200 by an optically transparent bonding layer.

The cover window 100 is disposed on the display panel 200. The cover window 100 serves to protect the display panel 200. The strengthened glass article 100 may be applied to a main body of the cover window 100. Since the cover window 100 is larger in size than the display panel 200, the side surface SS thereof may protrude outward from the side surface of the display panel 200, but it is not limited thereto. The cover window 100 may further include a print layer disposed on at least one surface of the glass article 100 at an edge portion of the glass article 100. The print layer of the cover window 100 may prevent the bezel area of the display device 500 from being visible from the outside, and may selectively perform a decoration function.

The optically transparent bonding layer 300 is disposed between the display panel 200 and the cover window 100. The optically transparent bonding layer 300 serves to fix the cover window 100 onto the display panel 200. The optically transparent bonding layer 300 may include an optically clear adhesive ("OCA"), an optically clear resin ("OCR"), or the like.

Figure 20:
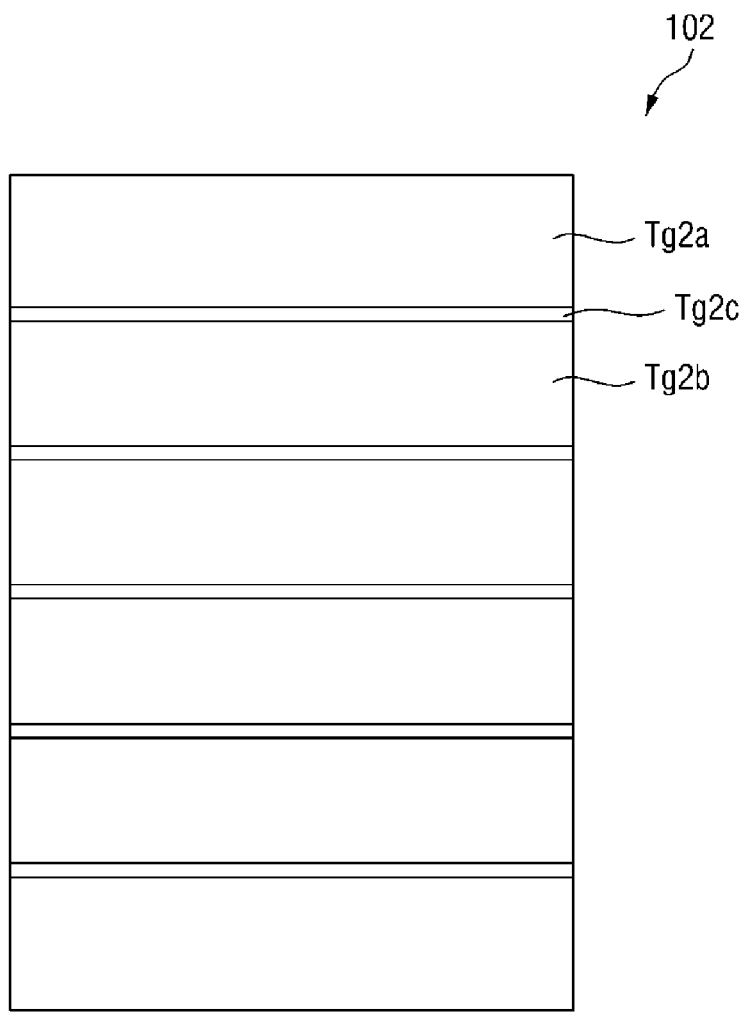
FIG. 20 is a plan view of a glass article according to an alternative exemplary embodiment.

FIG. 20 is a plan view of a glass article according to an alternative exemplary embodiment.

The glass article 102 shown in FIG. 20 is substantially the same as the embodiment of FIG. 18 except that the glass article 102 includes a plurality of portions having different glass transition temperatures therein.

In an embodiment, the glass article 102 may include a plurality of portions having different glass transition temperatures therein.

In one embodiment, for example, the glass article 102 may include a first pattern extending along the first direction DR1, a second pattern adjacent to the first pattern in the third direction DR3 and extending along the first direction DR1, and a third pattern adjacent to the second pattern in the third direction DR3 and extending along the first direction DR1. A glass transition temperature Tg2a of the first pattern, a glass transition temperature Tg2c of the second pattern, and a glass transition temperature Tg2b of the third pattern may be different from each other. The first pattern and the third pattern may be portions of the glass article formed by overlapping (corresponding to) the side patterns of FIG. 6 spaced apart from each other along the third direction DR3, respectively. The third pattern may be a portion of a glass article formed by overlapping (corresponding to) a space (where the second side portion 31b_1 is not disposed) between the adjacent side patterns of FIG. 6.

Figure 21:
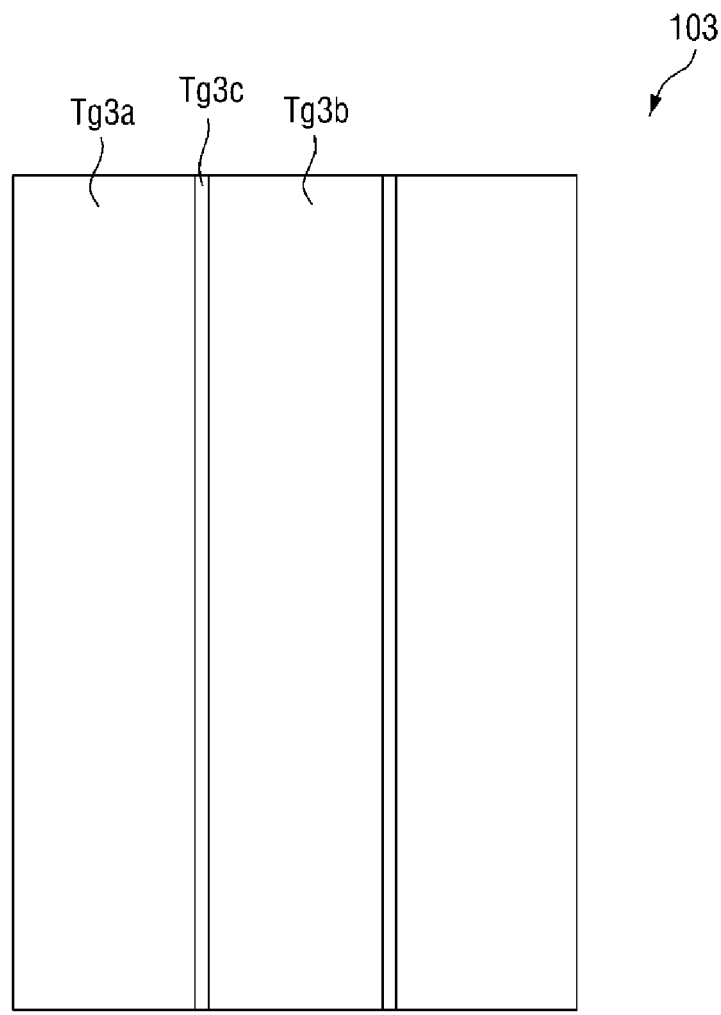
FIG. 21 is a plan view of a glass article according to another alternative exemplary embodiment.

FIG. 21 is a plan view of a glass article according to another alternative exemplary embodiment.

The glass article 103 shown in FIG. 21 is substantially the same as the embodiment of FIG. 18 except that the glass article 103 includes a plurality of portions having different glass transition temperatures therein.

In such an embodiment, the glass article 103 may include a plurality of portions having different glass transition temperatures therein.

In one embodiment, for example, the glass article 103 may include a fourth pattern extending along the third direction DR3, a fifth pattern adjacent to the fourth pattern in the first direction DR1 and extending along the third direction DR3, and a sixth pattern adjacent to the fifth pattern in the first direction DR1 and extending along the third direction DR3. A glass transition temperature Tg3a of the fourth pattern, a glass transition temperature Tg3c of the fifth pattern, and a glass transition temperature Tg3b of the sixth pattern may be different from each other. The fourth pattern and the sixth pattern may be portions of the glass article formed by overlapping (corresponding to) the side patterns of FIG. 9 spaced apart from each other along the first direction DR1, respectively. The fifth pattern may be another portion of a glass article formed by overlapping (corresponding to) a space (where the second side portion 31b_3 is not disposed) between the adjacent side patterns of FIG. 9.

The invention should not be construed as being limited to the exemplary embodiments set forth herein. Rather, these exemplary embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. An apparatus for manufacturing a glass article, the apparatus comprising:
a plurality of side portions spaced apart from each other;
a support portion which supports the side portions; and
a plurality of heat supply portions disposed on each of the side portions, wherein the side portions include a side portion disposed between outermost side portions, the plurality of heat supply portions are disposed directly on both of opposing surfaces of the side portion disposed between the outermost side portions, adjacent side portions adjacent to each other are disposed to face each other, each of the side portions includes a thermally conductive material, the thermally conductive material of each of the side portions overlaps the heat supply portions in a thickness direction of the side portions, a groove is defined by a depressed portion of the support portion from a surface of the support portion between the adjacent side portions, and a glass is allowed to be inserted into the groove between the adjacent side portions.

2. The apparatus of claim 1, wherein a heating rate thereof is about 40 K/min or greater.

3. The apparatus of claim 2, wherein the heating rate is variable.

4. The apparatus of claim 2, wherein each of the heat supply portions has a size of about 2 cm$^2$ or greater and includes a halogen lamp.

5. The apparatus of claim 1, wherein
the heat supply portions on one of the side portions are arranged in a matrix form in a first direction and a second direction intersecting the first direction.

6. The apparatus of claim 5, wherein
the thermally conductive material has a thermal conductivity of about 200 W/mk or greater, and
the thermally conductive material includes aluminum or a graphene.

7. The apparatus of claim 6, wherein each of the side portions includes a first side portion, and a second side portion disposed between the first side portion and the heat supply portions thereon.

8. The apparatus of claim 7, wherein in a plan view, the first side portion and the second side portion have a same size as each other.

9. The apparatus of claim 7, wherein the second side portion includes the thermally conductive material.

10. The apparatus of claim 9, wherein
the second side portion includes a plurality of side patterns, each having a linear shape extending in the first direction,
adjacent side patterns adjacent to each other are spaced apart from each other in the second direction, and
the side patterns are disposed to overlap the heat supply portions.

11. The apparatus of claim 10, wherein the heat supply portions disposed on one of the side patterns and the heat supply portions disposed on another one of the side patterns operate independently of each other.

12. The apparatus of claim 10, wherein the second side portion further includes a connection portion connecting the adjacent side patterns spaced apart from each other in the second direction to each other.

13. The apparatus of claim 5, wherein
the side portions are regularly arranged with a same separation distance therebetween, and
a separation distance between the adjacent side portions is in a range of about 1 cm to about 2 cm.

14. The apparatus of claim 5, wherein a separation distance between the groove and one of the adjacent side portions is equal to a separation distance between the groove and the other of the adjacent side portions.

15. The apparatus of claim 14, further comprising:
a fixing portion which fixes the glass disposed between the adjacent side portions.

* * * * *